(12) United States Patent
Colthurst

(10) Patent No.: US 11,472,503 B2
(45) Date of Patent: Oct. 18, 2022

(54) ERGONOMICALLY DESIGNED BICYCLE SADDLE

(71) Applicant: James Richard Colthurst, Hungerford (GB)

(72) Inventor: James Richard Colthurst, Hungerford (GB)

(73) Assignee: James Colthurst, Hungerford (GB)

( * ) Notice: Subject to any disclaimer, the term of this patent is extended or adjusted under 35 U.S.C. 154(b) by 0 days.

(21) Appl. No.: 17/144,174

(22) Filed: Jan. 8, 2021

(65) Prior Publication Data
US 2021/0214030 A1 Jul. 15, 2021

Related U.S. Application Data

(63) Continuation of application No. 29/750,605, filed on Sep. 15, 2020.

(60) Provisional application No. 62/959,199, filed on Jan. 10, 2020.

(51) Int. Cl.
*B62J 1/02* (2006.01)
*B62J 1/00* (2006.01)

(52) U.S. Cl.
CPC ............ *B62J 1/005* (2013.01); *B62J 1/007* (2013.01); *B62J 1/02* (2013.01)

(58) Field of Classification Search
CPC ............ B62J 1/005; B62J 1/007; B62J 1/02
See application file for complete search history.

(56) References Cited

U.S. PATENT DOCUMENTS

| X560698 | 5/1896 | Dyer |
| X582144 | 5/1897 | Moore |
| 4,387,925 A * | 6/1983 | Barker ............... B62J 1/005 297/215.15 |

(Continued)

FOREIGN PATENT DOCUMENTS

| DE | 202006001176 U1 | 5/2006 |
| EP | 0043278 A2 | 1/1982 |

(Continued)

OTHER PUBLICATIONS

International Search Report and Written Opinion, PCT/IB2021/050111, filed Jan. 8, 2021, naming James Colthurst as inventor; search report dated Mar. 15, 2021.

(Continued)

*Primary Examiner* — Philip F Gabler
(74) *Attorney, Agent, or Firm* — AWA Sweden AB; Thomas L. Ewing

(57) ABSTRACT

Embodiments of the invention provide a customizable bicycle saddle for a bicycle. The bicycle saddle has been designed to allow it to be adjusted to match the ischial tuberosities of each rider's pelvis in order to minimize the pressure placed on other portions of the rider's body while seated on the bicycle. The bicycle saddle comprises a first seating portion that has been configured to allow a rider to sit on the bicycle, a second seating portion that has been configured to allow the rider to sit on the bicycle. The bicycle saddle also includes a first adjustment means configured to allow the first seating portion to be moved closer to the second seating portion, and a second adjustment means configured to allow the saddle to be moved closer to a forward portion on the bicycle.

20 Claims, 10 Drawing Sheets

(56) References Cited

U.S. PATENT DOCUMENTS

| | | | |
|---|---|---|---|
| 4,512,608 A * | 4/1985 | Erani | B62J 1/005 |
| | | | 297/195.12 |
| 4,541,668 A * | 9/1985 | Rouw | B62J 1/002 |
| | | | 297/312 |
| 6,357,825 B1 * | 3/2002 | Bavaresco | B62J 1/002 |
| | | | 297/201 |
| 6,402,235 B1 * | 6/2002 | Letendre | B62J 1/005 |
| | | | 297/195.1 |
| 6,471,291 B1 | 10/2002 | Dodge et al. | |
| 6,652,025 B2 | 11/2003 | Sylvester | |
| 6,761,400 B2 | 7/2004 | Hobson | |
| 6,786,542 B1 * | 9/2004 | Nuzzarello | B62J 1/10 |
| | | | 297/195.1 |
| 7,104,600 B2 * | 9/2006 | Scholz | B62J 1/005 |
| | | | 297/201 |
| 7,249,800 B2 * | 7/2007 | Jalkanen | A47C 7/029 |
| | | | 297/202 |
| 7,273,250 B2 | 9/2007 | Oehler | |
| 7,934,770 B2 | 5/2011 | Toll | |
| 8,720,992 B2 | 5/2014 | Bigolin | |
| 9,022,954 B2 | 5/2015 | Niederberger | |
| 9,039,082 B2 | 5/2015 | Truglio | |
| 9,233,725 B2 | 1/2016 | Marcel | |
| 9,321,496 B2 | 4/2016 | Curless | |
| 9,738,341 B2 * | 8/2017 | Eldredge | B62J 1/005 |
| 9,821,867 B2 | 11/2017 | Goff | |
| 9,862,441 B2 | 1/2018 | Porter | |
| 9,889,898 B1 | 2/2018 | Marui | |
| 9,919,755 B2 | 3/2018 | Hsu | |
| 9,957,009 B2 | 5/2018 | Bigolin | |
| 10,144,469 B2 | 12/2018 | Marui | |
| 10,183,715 B2 | 1/2019 | Bigolin | |
| 10,252,760 B1 | 4/2019 | Leon | |
| 10,336,386 B2 * | 7/2019 | Hsu | B62J 1/08 |
| 10,479,430 B2 | 11/2019 | Yu | |
| 2018/0186420 A1 | 7/2018 | Yu | |

FOREIGN PATENT DOCUMENTS

| | | |
|---|---|---|
| GB | 611899 | 11/1948 |
| WO | 2009/040771 A1 | 4/2009 |

OTHER PUBLICATIONS

Gender Differences in Bicycle Saddle Pressure Distribution during Seated Cycling James J. Potter, Julie L. Sauer, Christine L. Weisshaar, Darryl G. Thelen and Heidi-Lynn Ploeg, the American College of Sports Medicine, 2008.

The normal ischiofemoral distance and its variations, I. Hujazi, T. Jones, S. Johal, P. Bearcroft, G. Muniz-Terra, and V. Khanduja, Journal of Hip Preservation Surgery vol. 3, No. 3, pp. 197-202.

A preliminary study of the measurement of external ischial tuberosity width and its gender differences, Yi-Lang Chen, Ping-Jui Yang, The Journal of Physical Therapy Science, J. Phys. Ther. Sci. 28: 820-823, 2016.

Team GB cyclist needed Vulva surgery after years on the saddle left her with the swollen body of someone who 'rubs up against bedposts'—as doctors warn thousands of keen women cyclists are being blighted by genital injuries, Daily Mail, https://www.dailymail.co.uk/health/article-6850943/Team-GB-cyclist-reveals-needed-VULVA-surgery-years-saddle.html, visited Jan. 8, 2021.

* cited by examiner

ERGONOMICALLY DESIGNED BICYCLE SADDLE

CROSS-REFERENCE TO RELATED APPLICATION

This application claims priority from U.S. Provisional Application 62/959,199, titled "Ergonomically Designed Bicycle Saddle" filed on 10 Jan. 2020 and from U.S. application Ser. No. 29/750,605, titled "Bicycle Saddle (Seat)" filed on 15 Sep. 2020. The entire contents of these priority applications are incorporated herein by reference.

FIELD

Embodiments of the invention relate to an improved bicycle saddle. More particularly, an embodiment of the invention relates to an improved bicycle saddle whose design has been made to accommodate the unique physiology of the human pelvis such that individual riders may comfortably ride bicycles for extended periods of time.

BACKGROUND

The following description includes information that may be useful in understanding embodiments of the invention. It is not an admission that any of the information provided is prior art or relevant to the claimed invention, or that any publication specifically or implicitly referenced is prior art.

Poorly designed bicycle saddles or seats have been associated with numerous physical injuries for both men and women. Cycling problems for men related to poor bicycle saddle design include: prostatitis, saddle sores, erectile dysfunction, incontinence, urethritis, and testicular pain. Cycling problems for women related to poor bicycle saddle design include incontinence, local trauma (bruising, rubbing, and inflammation), vaginitis, urinary tract infections, prolapse, and saddle sores.

Such problems are sufficiently common and severe to warrant coverage in various media. According to one report, a professional UK bicyclist required complicated genital surgery due to injuries caused by long-term use of a poorly designed bicycle saddle. (https://www.dailymail.co.uk/health/article-6850943/Team-GB-cyclist-reveals-needed-VULVA-surgery-years-saddle.html). When sensitive skin is exposed to friction it can cause the tissue to become rough and bleed, and may lead to infection, according to one surgeon.

Some women have even undergone surgery to remove parts of the vagina to make cycling more comfortable. A London surgeon disclosed in a 2016 article that she had seen rising numbers of women requesting labiaplasty (also known as "saddle surgery"), a painful procedure that involves cutting off part of the inner labia to stop it from rubbing and being pinched against bicycle saddles. The American Society of Plastic Surgeons also revealed that demand for labiaplasty had spiked 40 percent, with members performing 12,000 of the operations.

Yale University scientists writing in the Journal of Sexual Medicine found that cycling more than 100 miles per week—not a long distance for many cyclists—may damage the genitals. Researchers found this level of exercise led to an increase in pain and numbness and generalized "sexual dysfunction" for some cyclists. Excessive cycling may also lead to recurrent thrush or urinary tract infections. Another study published in the same journal found that 60 percent of competitive women cyclists suffer genital pain.

Some efforts can be found in the prior art to improve the design of bicycle saddles by generally making conventional saddle designs more comfortable, as opposed to reconsidering how a human should properly sit on a bicycle for an extended time period.

Therefore, for the reasons discussed above, a need exists for a more robust solution to the problem of providing the public with a bicycle saddle or seat that has been developed to provide comfort and safety for long duration riding.

SUMMARY OF THE INVENTION

Embodiments of the invention comprise a bicycle saddle for a bicycle that includes a first adjustable seating portion, the first adjustable seating portion shaped to accommodate a first of a user's two ischial tuberosities, such that a first portion of a mass of the user's upper body rests on the user's first ischial tuberosity on the first adjustable seating portion. The bicycle saddle also includes a second adjustable seating portion, the second seating portion shaped to accommodate a second of the user's two ischial tuberosities, such that a second portion of the mass of the user's upper body rests on the user's second ischial tuberosity on the second adjustable seating portion. A joining piece connects to the first adjustable seating portion and connects to the second adjustable seating portion, the first adjustable seating portion and the second adjustable seating portion aligned on the joining piece such that the mass of the user's upper body rests on the user's two ischial tuberosities on the first adjustable seating portion and the second adjustable seating portion.

BRIEF DESCRIPTION OF THE DRAWINGS

Figures provided herein may or may not be provided to scale. The relative dimensions or proportions may vary. Embodiments of the invention may be sized to fit within a variety of devices and larger systems.

DETAILED DESCRIPTION OF AN EMBODIMENT OF THE INVENTION

Embodiments of the invention provide an improved bicycle saddle or seat that has been designed to accommodate human anatomy, particularly the anatomy of the human pelvis, to provide support and comfort for cyclists, especially cyclists on long-duration tours.

The prior art in bicycle saddle design focuses primarily on receiving pressure in the human midline but not directly in helping the bicycle saddle cope with a proper distribution of human weight-bearing. Consequently, it's easy to see how soft tissue when seated on a bicycle saddle becomes squashed up and outwards from the midline. By comparison, a visit to a zoo shows monkey backsides with calluses where their weight goes when sitting, and humans and monkeys are both primates, sharing a common ancestor and similar pelvic structure.

In addition, male and female pelvis dimensions are very different, with women having a significantly greater width between their weight-bearing ischial tuberosities. Some studies indicate that the mean ischial tuberosity width for women is 135.3 mm and for men is just 114 mm. From an anatomical point of view, it's easy to see how soft tissue is squashed up and outwards from the midline when a rider is seated on a conventional bicycle saddle that has been designed as a one-size-fits all saddle.

Some of the features that embodiments of the invention aim to provide include:

1. Adjustability of the bicycle saddle to ensure that the primary support for a rider's weight is under the ischial tuberosities and that the front of the bicycle saddle is comfortable, and
2. That the bicycle saddle is more concave on top than convex to help the rider's posterior stay properly supported on the ischial tuberosities or "sit bones".

The inventor has observed that bicycle saddles (or seats) have shrunk in recent years but do not make allowance for the fact that human weight bearing, when sitting, should mainly reside on the 'ischial tuberosities' ('IT's) of the pelvis. In other primates these often are highlighted by calloused areas of skin on their backsides where there is buildup of solid skin to cope with the focal weight-bearing on hard surfaces. Nevertheless, in cycling, bicycle saddles have narrowed radically, and the weight-bearing is often taken away from the pelvic bones, ultimately resulting in soft tissue damage.

Figure 1:
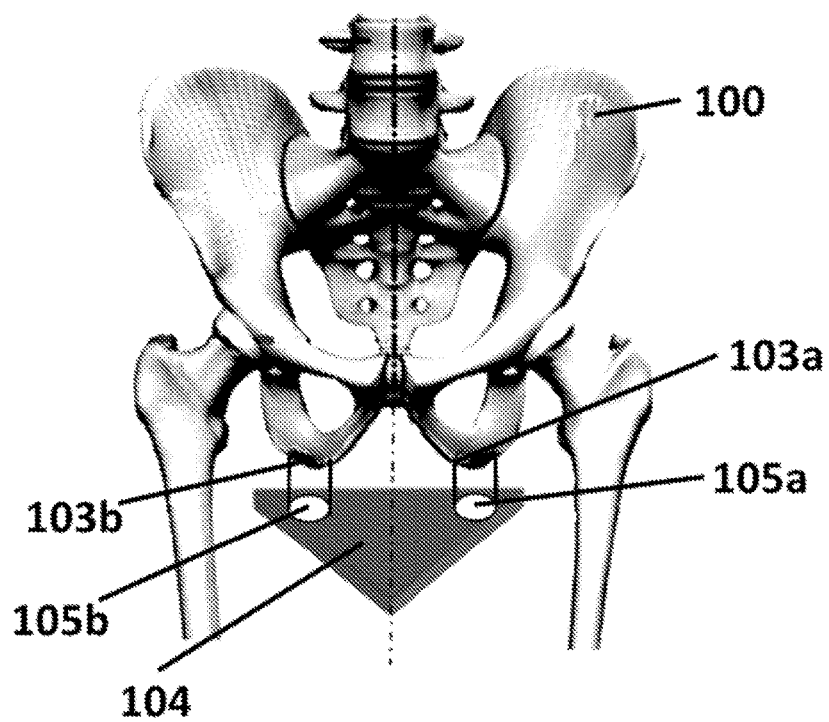
FIG. 01 illustrates a bicycle saddle 104, according to an embodiment of the invention.

FIG. 01 illustrates a bicycle saddle 104, according to an embodiment of the invention. As shown in FIG. 01, a human pelvis 100 includes two ischial tuberosities 103*a*, 103*b*. The two ischial tuberosities 103*a*, 103*b* represent the anatomical structures upon which a human body should preferably rest (e.g., carry the load bearing weight of the body's upper torso) when a person is seated or when riding a bicycle. As mentioned above, the width between the ischial tuberosities 103*a*, 103*b* differs from person to person and especially between men and women.

The bicycle saddle 104 includes two regions 105*a*, 105*b* situated approximately below and aligned with the ischial tuberosities 103*a*, 103*b* when the rider is seated on the bicycle saddle 104. The properly situated rider should then be able to ride comfortably for an extended period of time because the rider will have his/her weight centered on the regions 105*a*, 105*b* and not on some other region of the seat 104, according to an embodiment of the invention.

The seat 104 may be shaped to further facilitate the rider centering his/her weight in the regions 105*a*, 105*b*. For example, sloping the seat 104 in such a manner that the rider's body came to rest with the ischial tuberosities 103*a*, 103*b* centered on the regions 105*a*, 105*b* would help accomplish this objective, according to an embodiment of the invention. The regions 105*a*, 105*b* may also represent holes in the saddle 104, according to some embodiments of the invention. When present, such holes may provide further guidance to users in terms of proper seating location. However, in many cases it may be equally satisfactory to adjust or construct the seat 104 itself such that the user naturally sits in the regions 105*a*, 105*b*, which serve as a primary weight-bearing region for the bicycle saddle 104, according to an embodiment of the invention. Thus, the bicycle saddle 104 operates on an anatomically sound principle.

There are several ways for arranging the structure associated with various embodiments of the bicycle saddle 104 to achieve the key features provided by embodiments of the invention:

1. Adjustability of the saddle 104 width to suit the rider's pelvic bones.
2. Concavity of the saddle 104 to keep the rider's bottom seated properly.

Some embodiments of the saddle 104 may include removable "plugs" that file holes in the regions 105*a*, 105*b* in the bicycle saddle 104 to further ensure adjustment of the rider's weight to correct for the lowest portion of the user's anatomy.

Because the distance between the ischial tuberosities 103*a*, 103*b* varies from male to female (and person to person), the bicycle saddle 104 should preferably be adjustable to allow for these individual differences—or be built to account for these anatomical differences. In other words, the bicycle saddle 104 should preferably include a means to vary the distance between the regions 105a, 105b to match differing ischial tuberosities 103a, 103b, according to an embodiment of the invention. In addition, a gap along the middle of the bicycle saddle 104 could alleviate damage to organs such as the prostate for male riders and the vulva for female riders. Thus, an overall goal for embodiments of the bicycle saddle 104 is to maximize the rider's comfort by taking weight properly and protecting the "soft tissue" components near the pelvis 100.

As noted, a user of bicycle saddles associated with embodiments of the invention should have the width of his/her ischial tuberosities measured or determined in order to adjust the bicycle seats correctly. The academic literature indicates that it can be difficult to measure precisely where the weight bearing points 103a, 103b are on the pelvis 101.

The distance between the ischial tuberosities 103a, 103b may be measured using the following procedure. A foam block may be placed on a short stool positioned next to a wall. Users may place their backs flat against the wall and lower themselves onto the foam resting on the stool. Once an initial impression has been made on the foam, the user may pull up on the foam and press down again to ensure that a deep measurable impression has been made in the foam. Small spherical objects, such as ball bearings, may rolled on the foam indentations until they come to rest at the deepest points of the impressions. The width of the ischial tuberosities 103a, 103b may be determined by measuring the distance between the ball bearings with a ruler, yardstick or tape measurer. Similarly, a user may sit on a soft surface (in a riding position, for example) and put both hands under the user's bum to feel where the two pressure points of ischial tuberosity 103a, 103b reside, then stand up and mark the points. Even this simple approach provides reasonably accurate results.

Alternatively, if the user has an X-ray, CT scan, or the like of the pelvic region, the ischial tuberosities 103a, 103b may be precisely measured. Of course, the measurement will need to account for any scaling of the image versus the actual size of the user's pelvis.

Figure 20:
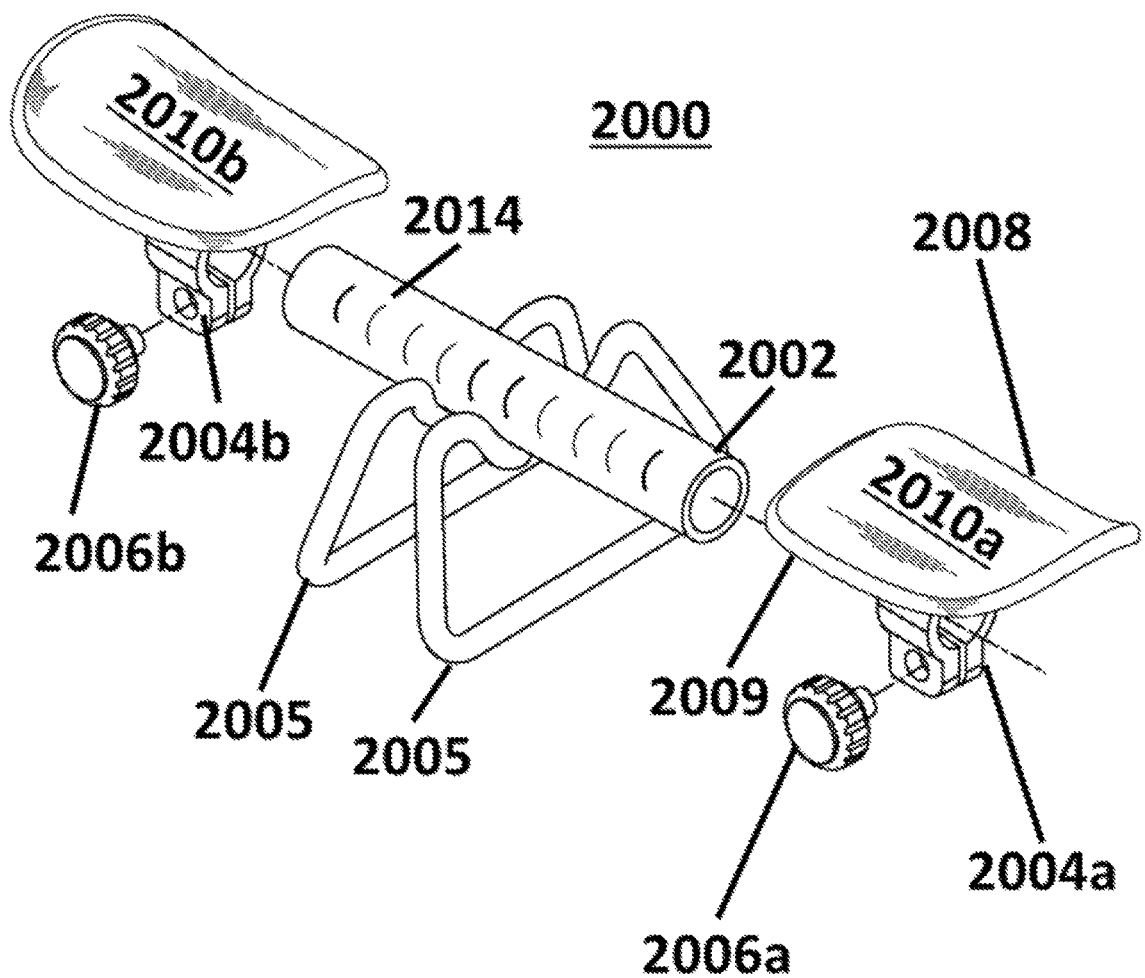
FIG. 20 illustrates an exploded view of a saddle 2000 having two adjustable seating portions 2010*a*, 2010*b*, according to an embodiment of the invention.

As another alternative, special measuring embodiments of the adjustable bicycle seats described herein may be employed as devices for measuring a user's ischial tuberosities. For example, the regions 105a, 105b shown in the bicycle saddle 104 in FIG. 01 could be turned into holes and by repeated adjustments of the distance between the two regions 105a, 105b, the user's ischial tuberosities may be determined. In place of a fixed piece bicycle saddle such as the bicycle saddle 104, an adjustable bicycle saddle such as the bicycle saddle 404a shown in FIG. 04, or the bicycle saddle 606 shown in FIG. 06, or the bicycle saddle 1300 shown in FIG. 13 may be more suited to taking such measures. The holes in these saddles would correspond to a location in those saddles deigned to be the optimal location for a user's ischial tuberosities 103a, 103b. FIG. 20 illustrates a series of markings 2014 that may aid in the adjustment of the saddle 2000 itself to match the ischial tuberosities 103a, 103b.

Figure 19:
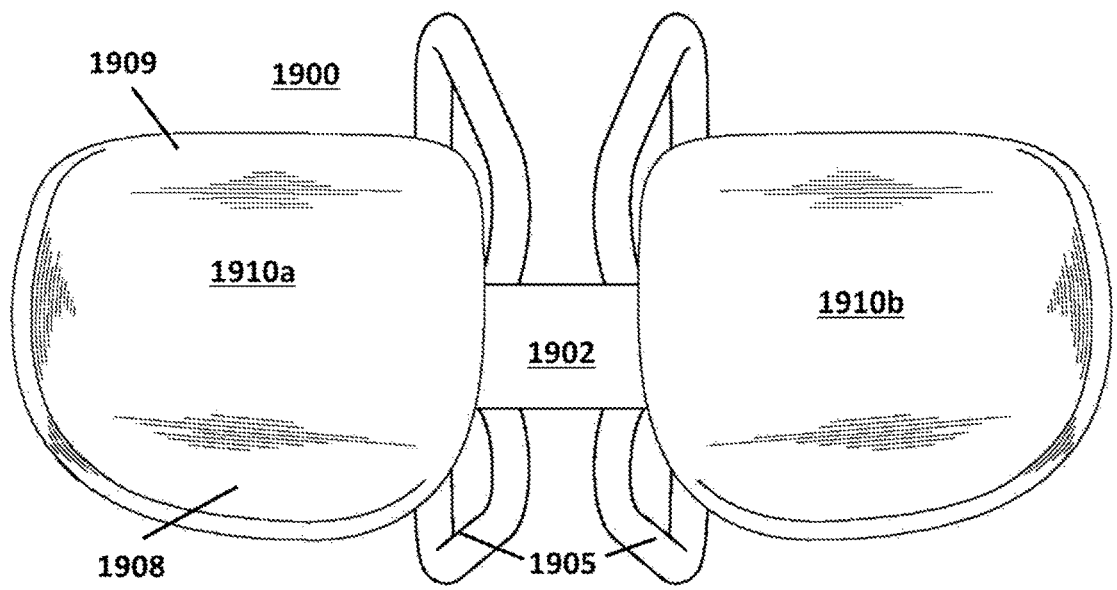
FIG. 19 illustrates a top plan view of a saddle 1900 having two adjustable seating portions 1910*a*, 1910*b*, according to an embodiment of the invention.

As shown in many of the figures, the two adjustable seating portions are not intended to touch each other (e.g., the adjustable seating portions 1910a, 1910b shown in FIG. 19 are maintained some distance apart in operation). The open space between the two adjustable seating portions is intended to provide enhanced safety for the user and intended to solve some of the health and safety problems previously mentioned. Commercial embodiments of the invention may include adjustable seating portions of differing sizes. A user should select a seating size whose combined distances from seat center to seat edge are less than the user's ischial tuberosity width, e.g., a user with an ischial tuberosity width of 14 cm could choose seats having an overall width of 7.62 cm (the distance from each seat's center to seat edge is 3.81 cm, leaving a separation between the two seats of 6.38 cm (14 cm−(3.82 cm×2)=6.38 cm).

The typical user's ischial tuberosity separation is not likely to change with any frequency. Consequently, once a user has measured this distance, then the user will likely not need to have the measurement made again, assuming that an accurate measurement has been made.

Figure 2:
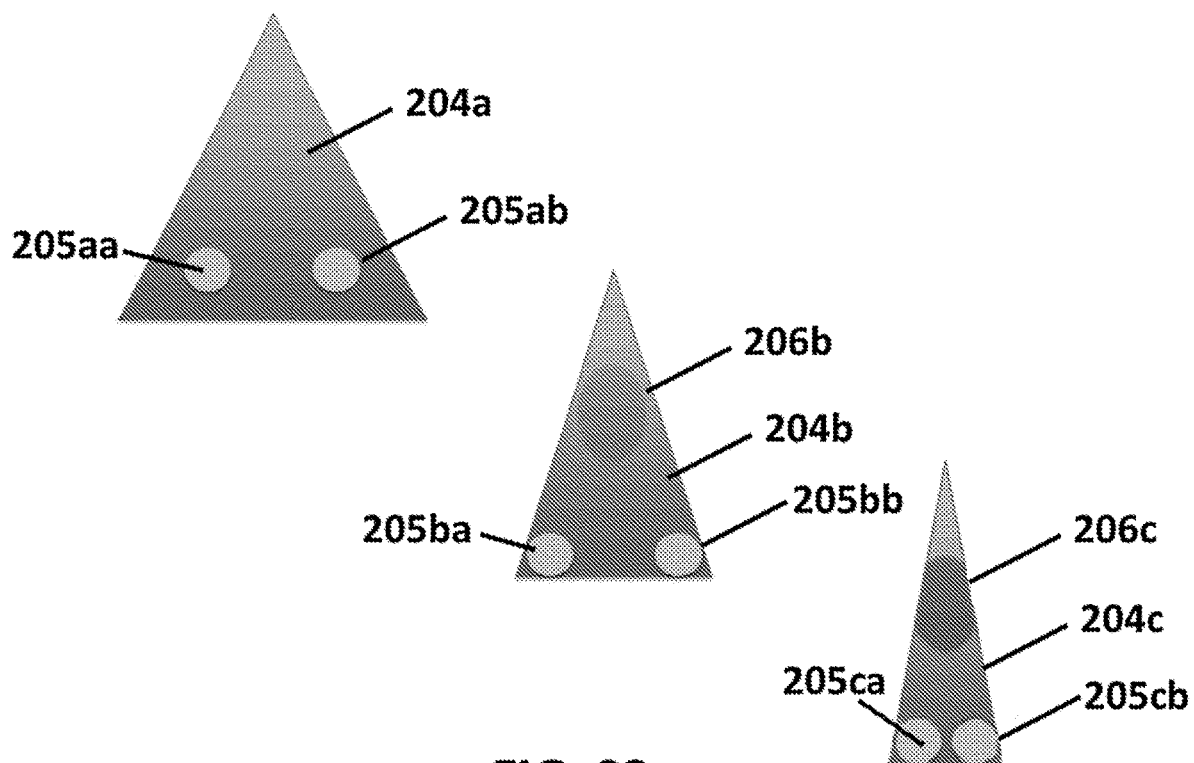
FIG. 2 illustrates three exemplary bicycle saddles 204a, 204b, and 204c for women riders, according to an embodiment of the invention.

FIG. 2 illustrates three exemplary bicycle saddles 204a, 204b, and 204c for women riders, according to an embodiment of the invention. Each bicycle saddle includes left regions 205aa, 205ba, and 205ca and right regions 205ab, 205bb, and 205cb that correspond to the regions 105b, 105a shown in FIG. 1 and should align with each respective user's ischial tuberosities when the rider is properly seated in the bicycle saddle 204a, 204b, and 204c.

The bicycle saddle 204c is narrower than the saddle 204b, which itself is narrower than the saddle 204a. The bicycle saddles 204a-204c have been customized for their respective riders after a proper measurement of their ischial tuberosities, according to an embodiment of the invention. In other embodiments of the invention, the bicycle saddles 204a-204c may actually be the same saddle but adjusted to be wider or narrower to suit a particular rider. In such embodiments, the bicycle saddles 204a-204c have still been customized for the unique ischial tuberosities of each rider but could theoretically adjusted to accommodate another rider. Thus, such a design approach would likely be amenable to mass production.

As discussed with the regions 105a, 105b in FIG. 1, the regions 205aa, 205ab, 205ba, 205bb, 205ca, and 205cb might include holes to help the rider locate a proper seated position, and these holes might also be accompanied by plugs that could be used to fill in the holes, according to an embodiment of the invention.

The area 206b, 206c outline areas where the bicycle saddles 204b, 204c should take caution to be extra comfortable for the rider in order to minimize the chance of injury. The bicycle saddles displayed thus far—saddles 104, 204a, 204b, and 204c have a conventional triangular shape. As discussed in conjunction with further embodiments of the invention, removal of the tip point of the seat triangle, such as the areas 206b and 206c, may reduce the rider's chances of injury further.

Figure 3:
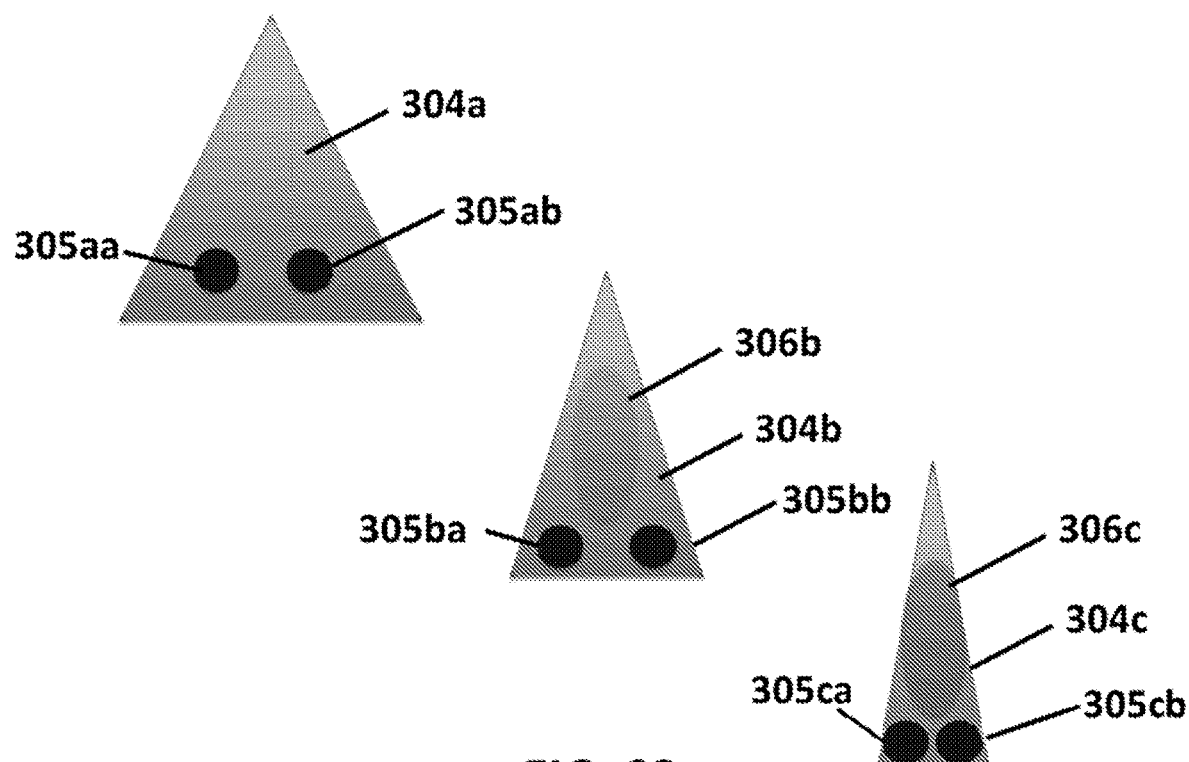
FIG. 3 illustrates three exemplary bicycle saddles 304a, 304b, and 304c for male riders, according to an embodiment of the invention.

FIG. 3 illustrates three exemplary bicycle saddles 304a, 304b, and 304c for male riders, according to an embodiment of the invention. Each bicycle saddle includes left regions 305aa, 305ba, and 305ca and right regions 305ab, 305bb, and 305cb that correspond to the regions 105b, 105a shown in FIG. 1 and should align with each respective user's ischial tuberosities when the rider is properly seated in the bicycle saddle 304a, 304b, and 304c.

The bicycle saddle 304c is narrower than the saddle 304b, which itself is narrower than the saddle 304a. The bicycle saddles 304a-304c have been customized for respective riders after a proper measurement of their ischial tuberosities, according to an embodiment of the invention. In other embodiments of the invention, the bicycle saddles 304a-304c may actually be the same saddle but adjusted to be wider or narrower to suit a particular rider. In such embodiments, the bicycle saddles 304a-304c have still been customized for the unique ischial tuberosities of each rider but could theoretically adjusted to accommodate another rider. Thus, such a design would be amenable to mass production.

As discussed with the regions 105a, 105b in FIG. 1, the regions 305aa, 305ab, 305ba, 305bb, 305ca, and 305cb might include holes to help the rider locate a proper seated position, and these holes might also be accompanied by plugs that could be used to fill in the holes, according to an embodiment of the invention.

The area 306b, 306c outline areas where the bicycle saddles 304b, 304c should take caution to be extra comfortable for the rider in order to minimize the chance of injury. The reader may notice that the areas 306b, 306c are longer and larger than the areas 206b, 206c shown in FIG. 02. The reason for the larger area for the male areas 306b, 306c relates to the male anatomy, particularly the rider's testicles. As mentioned above, the bicycle saddles displayed thus far have a conventional triangular shape. As discussed in conjunction with further embodiments of the invention, removal of the tip point of the seat triangle, such as the areas 306b and 306c, may reduce the rider's chances of injury further.

Figure 4:
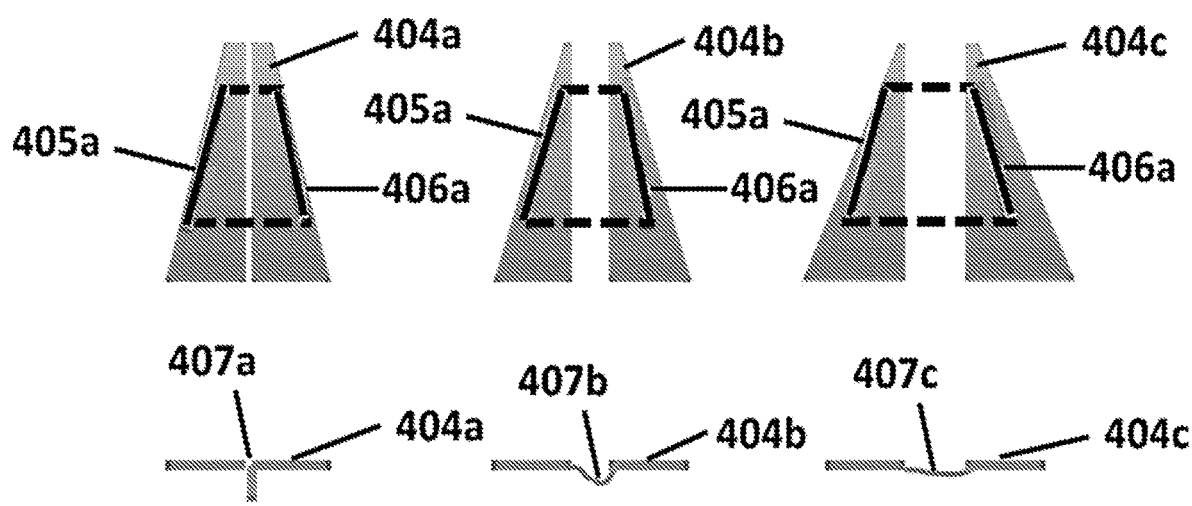
FIG. 4 illustrates a bicycle saddle 404a, 404b, 404c shown with differing amounts of separation between two support regions 405a, 406a, according to an embodiment of the invention.

FIG. 4 illustrates a bicycle saddle 404a, 404b, 404c shown with differing amounts of separation between two adjustable seating portions 405a, 406a, according to an embodiment of the invention. The saddles 404a-404c could represent different saddles or the saddles 404a-404c could represent the same saddle, provided the saddle includes a mechanism for controlling the separation between the adjustable seating portions 405a, 406a.

Thus, saddles 404a-404c correspond to the "fixed" saddles 204a-204b shown in FIG. 02 and the "fixed" saddles 304a-304c shown in FIG. 03. Instead of using the distance between the rider's ischial tuberosities to build a customized saddle made for that user, the saddles 404a-404c allow a user who knows the distance between their ischial tuberosities to adjust the saddle 404a-404c to fit that distance, according to an embodiment of the invention.

The adjustable seating portions 405a, 406a, each respectively include a support bar 405a, 405b, which would likely be embedded in the saddle 404a-404c to avoid direct contact with the user. The support bar may attach to a standard parallel rod support fixed to a standard bicycle frame bracket that holds the saddle 404a-404c.

FIG. 04 also shows the saddles 404a-404c from behind on a horizontal plane that corresponds to each saddle 404a-404c. Each saddle 404a-404c includes a representative attachment 407a, 407b, 407c that reflects how far apart the saddle's adjustable seating portion 405a is from its counterpart adjustable seating portion 405c, which allows customization to the user's ischial tuberosities, according to an embodiment of the invention.

Figure 5:
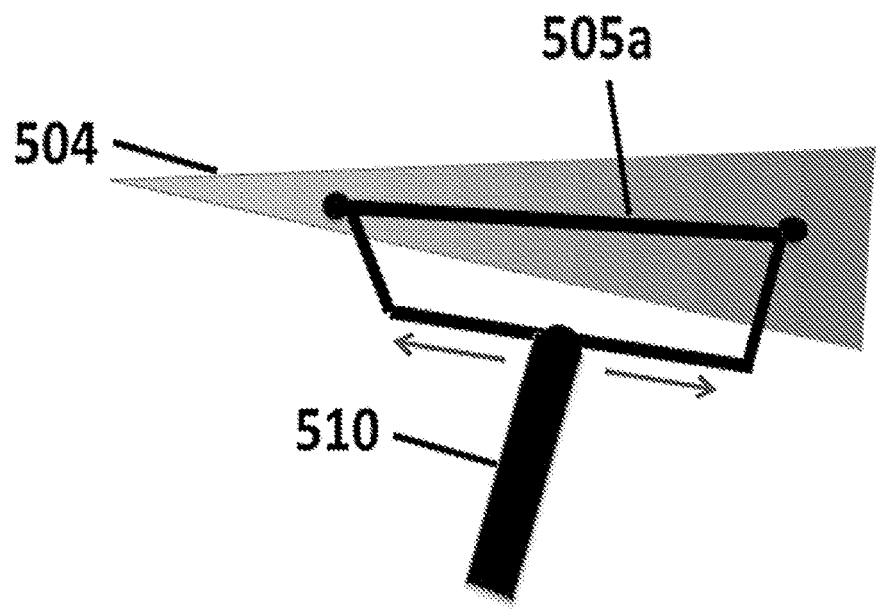
FIG. 05 illustrates a bicycle saddle 504 in profile, according to embodiment of the invention.

FIG. 05 illustrates a bicycle saddle 504 in profile, according to embodiment of the invention. The saddle 504 includes a support bar 505a that ultimately attaches to the support pole 510 coming from the bicycle frame (not shown). Various types of attachment devices may be used in combinations with various embodiments of the invention shown in all the figures herein to attach the bicycle saddles to the bicycle frame.

The bicycle saddle 504, in addition to being adjustable for the user's comfort with respect to the user's IT may also be adjustable to allow for a comfortable distance from the bicycle handlebars, according to an embodiment of the invention. In other words, the bicycle saddle 504 is configurable to be moved closer to the bicycle handlebar, according to an embodiment of the invention.

Figure 6:
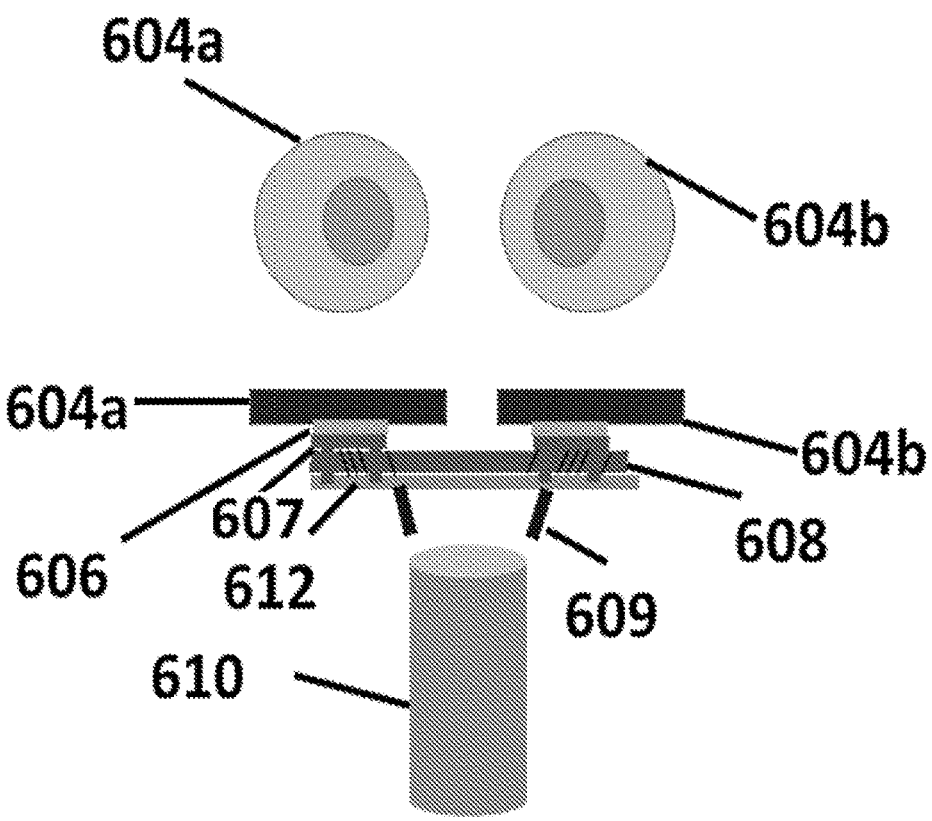
FIG. 6 illustrates an adjustable bicycle saddle 606 that aims to provide a proper distance between the user's ischial tuberosities and minimize the stress on the user's posterior area, according to an embodiment of the invention.

FIG. 06 illustrates an adjustable bicycle saddle 606 that aims to provide a proper distance between the user's ischial tuberosities and minimize the stress on the user's posterior area, according to an embodiment of the invention. The bicycle saddle 606 includes two padded adjustable seating portions 604a, 604b that may be spaced apart at an optimal distance between the user's ischial tuberosities, according to an embodiment of the invention. The padding material used in the two padded adjustable seating portions 604a, 604b may comprise various Shore Durometer measurements, e.g., 15-30 on the Shore 00 scale. The adjustable seating portions 604a, 604b may comprise a roughly circular circumferential shape that departs from the conventional triangular circumference for bicycle saddles. The adjustable seating portions 604a, 604b are each roughly circular in nature and collectively would form an elliptical shape. Moreover, the adjustable seating portions 604a, 604b are relatively small, roughly corresponding to the size of the user's palm (or roughly 2 to 3 inches across (or 50.8 mm to 76.2 mm)), according to an embodiment of the invention.

The adjustable seating portions 604a, 604b are also shown in a top down view in FIG. 06 and may include a region (shown darkened) that corresponds to the user's ischial tuberosities. The padded adjustable seating portions 604a, 604b may include firmer sections (e.g. the darkened area would have a higher Shore Durometer measurement) underneath the rider's weight-bearing spot, according to an embodiment of the invention. Similarly, these regions on the adjustable seating portions 604a, 604b may also include padding and/or cushioning material, according an embodiment of the invention.

The bicycle saddle 606 may be configured in a manner consistent with the bicycle saddles shown in FIGS. 2-5, according to an embodiment of the invention. Accordingly, the saddle 606 includes two fixing rails 609 that attach to a bicycle stem 610 that itself attaches to the bicycle frame (not shown). The two fixing rails 609 attach to a foundation plate 612 that itself holds a threaded adjuster 608 placed inside a box section 607 on each side of the saddle 606. The threaded adjuster 608 allows for the two adjustable seating portions 604a, 604b of the bicycle saddle 606 to be brought either closer together or farther apart to match the width of the user's ischial tuberosities, according to an embodiment of the invention.

Figure 7:
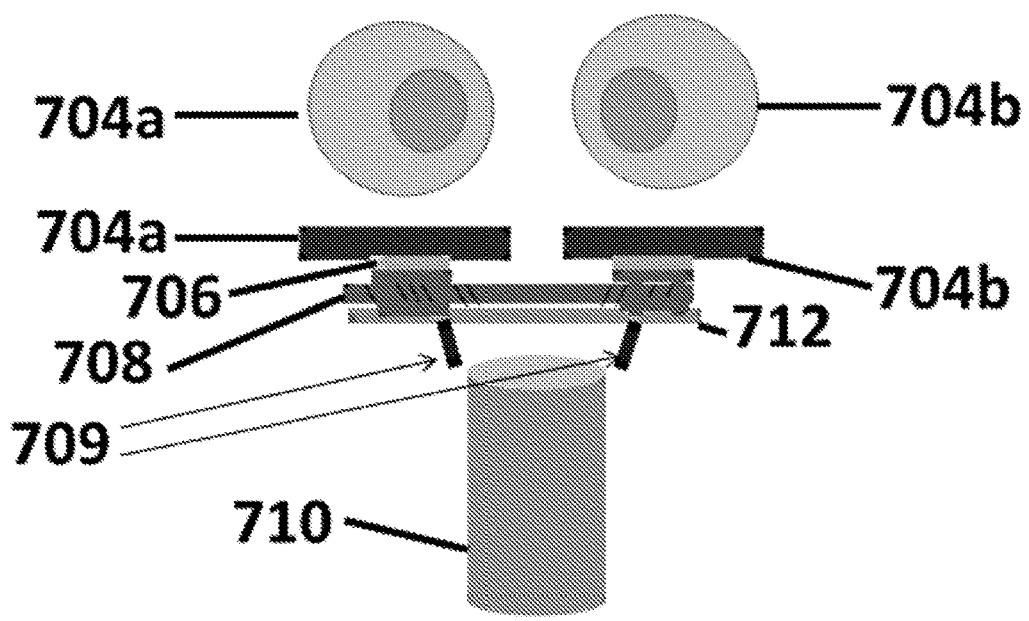
FIG. 07 illustrates an adjustable bicycle saddle 706 that aims to provide a proper distance between the user's ischial tuberosities and minimize the stress on the user's posterior area, according to an embodiment of the invention.

FIG. 07 illustrates an adjustable bicycle saddle 706 that aims to provide a proper distance between the user's ischial tuberosities and minimize the stress on the user's posterior area, according to an embodiment of the invention. The bicycle saddle 706 includes two adjustable seating portions 704a, 704b that may be spaced apart at an optimal distance between the user's ischial tuberosities, according to an embodiment of the invention. The adjustable seating portions 704a, 704b may comprise a roughly circular circumferential shape that differs from the conventional triangular circumference for bicycle saddles and aims to further reduce rider injuries. The adjustable seating portions 704a, 704b are each roughly circular in nature. Moreover, the adjustable seating portions 704a, 704b are relatively small, roughly corresponding to the size of the user's palm (or roughly 2 to 3 inches across (or 50.8 mm to 76.2 mm)), according to an embodiment of the invention.

The adjustable seating portions 704a, 704b are also shown in a top down view and may include a region (shown darkened) that corresponds to the user's ischial tuberosities. The adjustable seating portions 704a, 704b may include firmer sections (e.g. the darkened area) underneath the rider's weight-bearing spot, according to an embodiment of the invention. Similarly, these regions on the adjustable seating portions 704a, 704b may also include padding and/or cushioning material of various Shore Durometer measurements, according an embodiment of the invention.

The bicycle saddle 706 may be configured in a manner consistent with the bicycle saddles shown in FIGS. 2-6, according to an embodiment of the invention. Accordingly, the saddle 706 includes two fixing rails 709 that attach to a bicycle stem 710 that itself attaches to the bicycle frame (not shown). The two fixing rails 709 attach to a foundation plate 712 that itself holds a threaded adjuster 708 placed inside a box section similar to the box section 607 shown in FIG. 06. The threaded adjuster 708 allows for the two adjustable seating portions 704a, 704b of the bicycle saddle to be brought either closer together or farther apart, to match the width of the user's ischial tuberosities, according to an embodiment of the invention.

Figure 8:
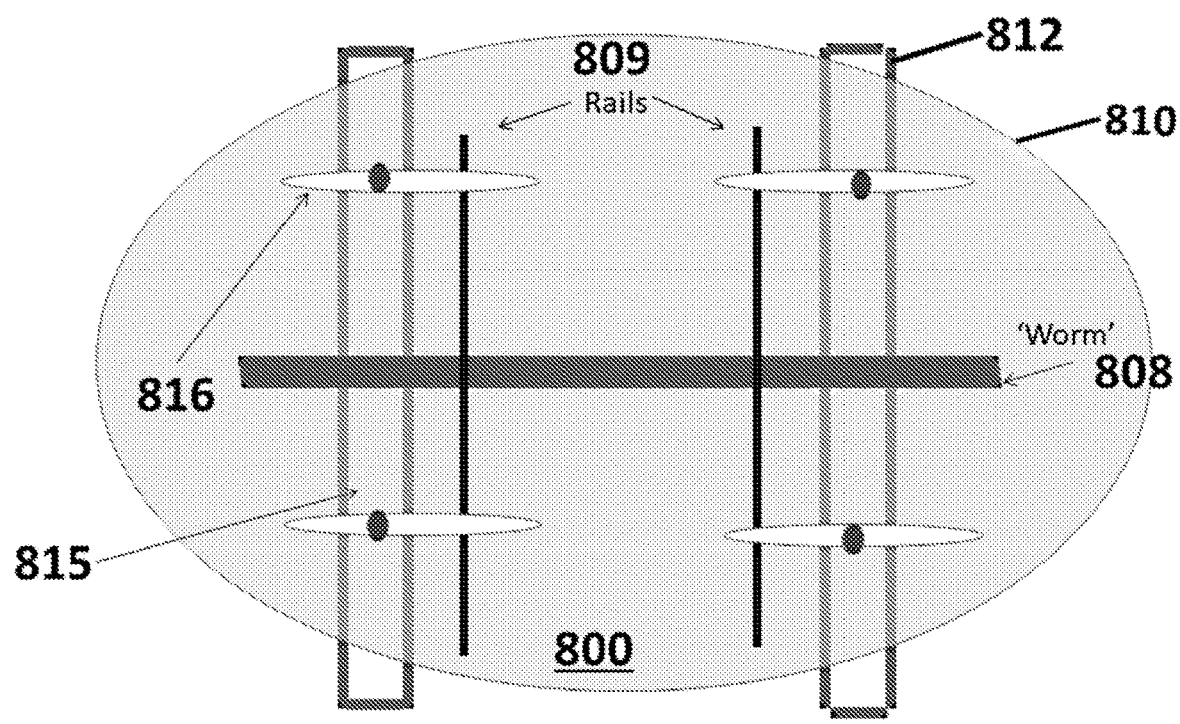
FIG. 08 illustrates a bicycle saddle 800 having a pair of rails 809 that allow for forward/backward adjustment of the two adjustable seating portions of the bicycle saddle 800, according to an embodiment of the invention.

FIG. 08 illustrates a bicycle saddle 800 having a pair of rails 809 that allow the for forward/backward adjustment of the two adjustable seating portions of the bicycle saddle 800, according to an embodiment of the invention. FIG. 08 illustrates the two adjustable seating portions, such as the adjustable seating portions 704a, 704b shown in FIG. 07, as a combined ellipsis 810. Of course, to adjust saddle 800 to match the user's ischial tuberosities, the saddle 800 would need to comprise two separate adjustable seating portions (e.g., 704a, 704b) that covered each of the rail areas 809 to the edge of the worm 808, according to an embodiment of the invention. The saddle 800 has an overall elliptical circumference as opposed to the conventional triangular circumference in order to minimize rider injuries. Thus, the saddle 800 has been developed to hold a minimal surface area of the user's posterior, focused on the user's ischial tuberosities.

The bicycle saddle 800 includes a pair of base plates 812, and a slot in the base plates allows for sideways movement of each adjustable seating portion of the bicycle saddle 800, according to an embodiment of the invention. Similarly, another slot in the box section allows for forward/backward movement of a respective half of the bicycle saddle 800, according to an embodiment of the invention. The saddle 800 includes a worm 808, or a similar screw, that facilitates adjustments between the two adjustable seating portions of the saddle 800. Thus, by using these adjustment mechanisms, the bicycle saddle 800 may be configured to adjust to each rider's unique physiology as represented by the width of the user's ischial tuberosities.

Figure 9:
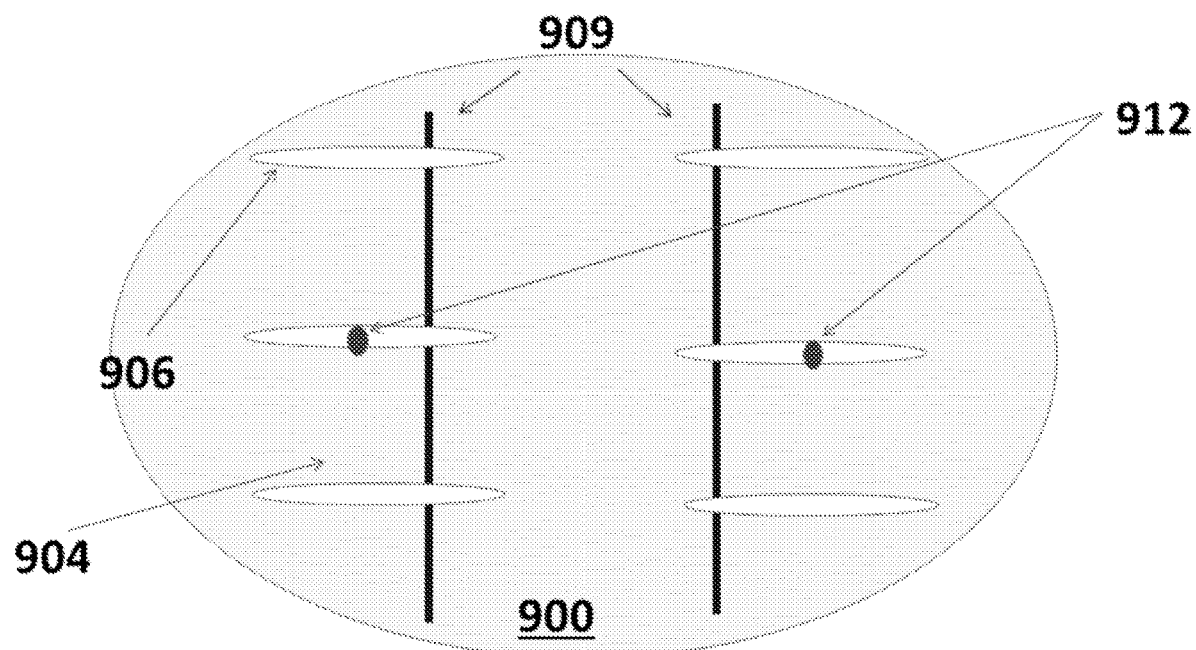
FIG. 09 illustrates a bicycle saddle 900 having one adjuster 909 on each adjustable seating portion and three slots 906 on each adjustable seating portion to keep the seat elements in line, according to an embodiment of the invention.

FIG. 09 illustrates a bicycle saddle 900 having one adjuster 909 on each adjustable seating portion and three slots 906 on each adjustable seating portion to keep the seat elements in line, according to an embodiment of the invention. This particular embodiment has no requirement for the worm shown in FIG. 08. Of course, to adjust saddle 900 to match the user's ischial tuberosities, the saddle 900 would comprise two separate adjustable seating portions (e.g., the adjustable seating portions 1004a, 1004b shown in FIG. 10) that covered each of the rail areas 909 to the edge of the worm 908, according to an embodiment of the invention. The saddle 900 has an overall elliptical circumference as opposed to the conventional triangular circumference to minimize user injuries. Thus, the saddle 900 has been developed to hold a minimal surface area of the user's posterior, focused on the user's ischial tuberosities.

Each adjustable seating portion of the saddle 900 includes a rail 909, and each rail has three base plates 906. A first baseplate 906a, close to the forward-facing area of the saddle 900 includes a slot that allows sideways movement, such that two adjustable seating portions of the saddle 0900 may be brought closer together. A second baseplate 906b, close the back-facing area of the saddle 900 includes a slot in a box section that allows forward/backwards movement. A middle baseplate 906c includes a wingnut 912 that may be used to secure the rail, according to an embodiment of the invention. With the rails allowing forward/backward adjustment, there is no need for the slots on the baseplate to do the same. Thus, the saddle 900 may be adjusted into a variety of configurations to best fit each given rider's unique physiology as expressed by the width of the user's ischial tuberosities.

Figure 10:
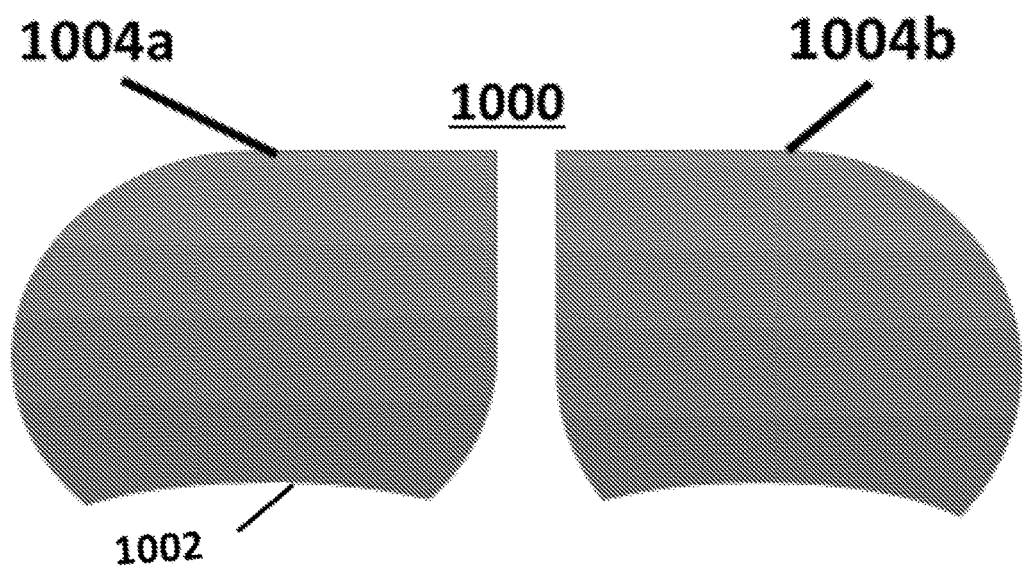
FIG. 10 illustrates a saddle 1000 having two adjustable seating portions 1004*a*, 1004*b*, according to an embodiment of the invention.

FIG. 10 illustrates a saddle 1000 having two adjustable seating portions 1004a, 1004b, according to an embodiment of the invention. The adjustable seating portions 1004a, 1004b are compatible with the saddle designs shown in previous figures. In other words, the two adjustable seating portions 1004a, 1004b could be mounted on the supporting structures shown in FIG. 06-09.

The adjustable seating portions 1004a, 1004b have been formed to accommodate the shape of the rider's physiology. Thus, a front region 1002 on each half 1004a, 1004b facilitates the placement of the rider's upper thigh. The saddle 1000 aims to allow the user to sit on the bicycle at an appropriate weight bearing location with the ischial tuberosities bearing up the weight of the rider's upper body with only minimal portions of the rest of the user's body even touching the saddle 1000.

Figure 11:
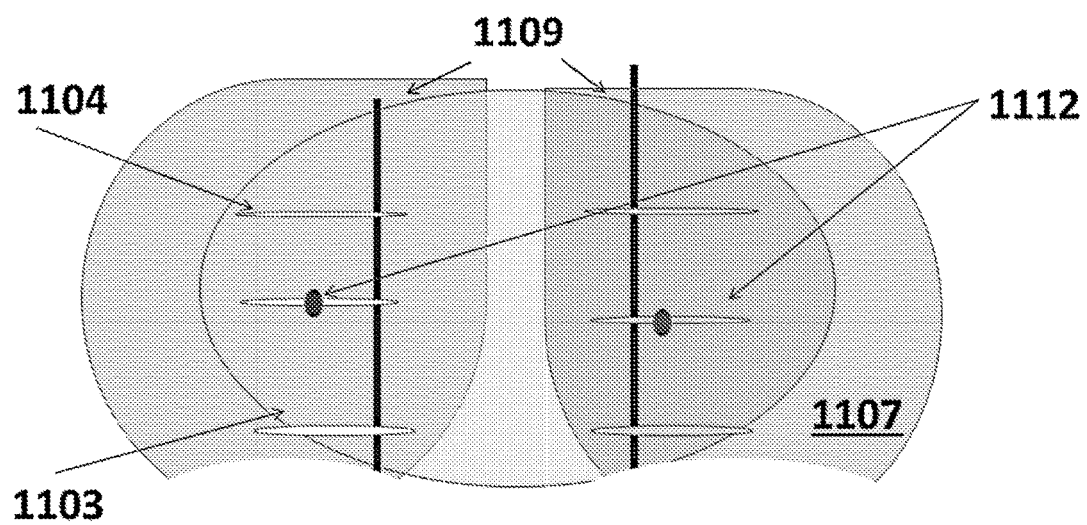
FIG. 11 illustrates a saddle 1100 that combines elements of the saddle 900 shown in FIG. 09 with the saddle 1000 shown in FIG. 10, according to an embodiment of the invention.

FIG. 11 illustrates a saddle 1100 that combines elements of the saddle 900 shown in FIG. 09 with the saddle 1000 shown in FIG. 10, according to an embodiment of the invention. Thus, the saddle 1100 includes two rails 1109 that control the two adjustable seating portions of the saddle 1100. A slot in the baseplate on the saddle 1100 allows the baseplate to move sideways, allowing the two adjustable seating portions of the saddle 1100 to move closer or farther apart. The saddle 1100 includes a slot in a box section to accommodate forward/backwards movement. With the rails allowing forward/backward adjustment, there is no need for slots on the baseplate to do the same thing, according to an embodiment of the invention.

Figure 12:
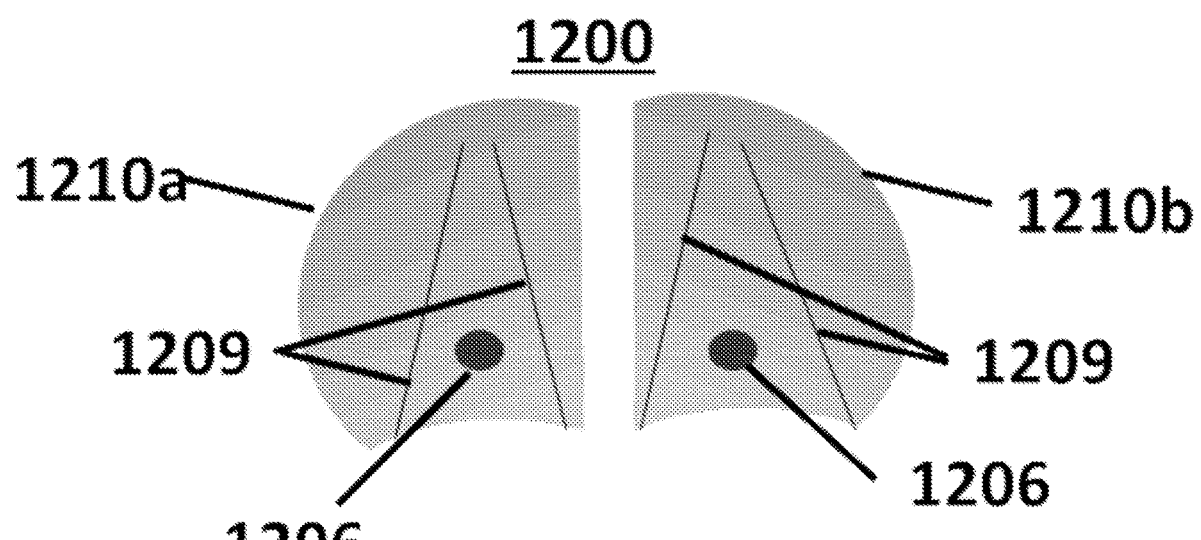
FIG. 12 illustrates a saddle 1200 having two adjustable seating portions 1210*a*, 1210*b*, according to an embodiment of the invention.

FIG. 12 illustrates a saddle 1200 having two adjustable seating portions 1210a, 1210b. Each adjustable seating portion of the saddle 1200 includes at least one groove 1209 to act as a gutter when the saddle 1200 is wet to allow water to run off rather than pool on the saddle 1200. The pooling of water on the saddle 1200 is possibly more significant than conventional bicycle saddles because the seat of the saddle 1200 is concave rather than convex like the conventional bicycle seat, according to an embodiment of the invention. The concave saddle 1200 will be employed to assist the rider in maintaining a proper and comfortable position while riding. The gutter grooves 1209 should be placed away from the main pressure points for the saddle 1200 (marked here as circles 1206) to avoid creating a "friction" point that could cause the rider discomfort or injury. The pressure points 1206 should also represent the points corresponding to the user's ischial tuberosities, assuming that the saddle 1200 has been properly fitted.

Figure 13:
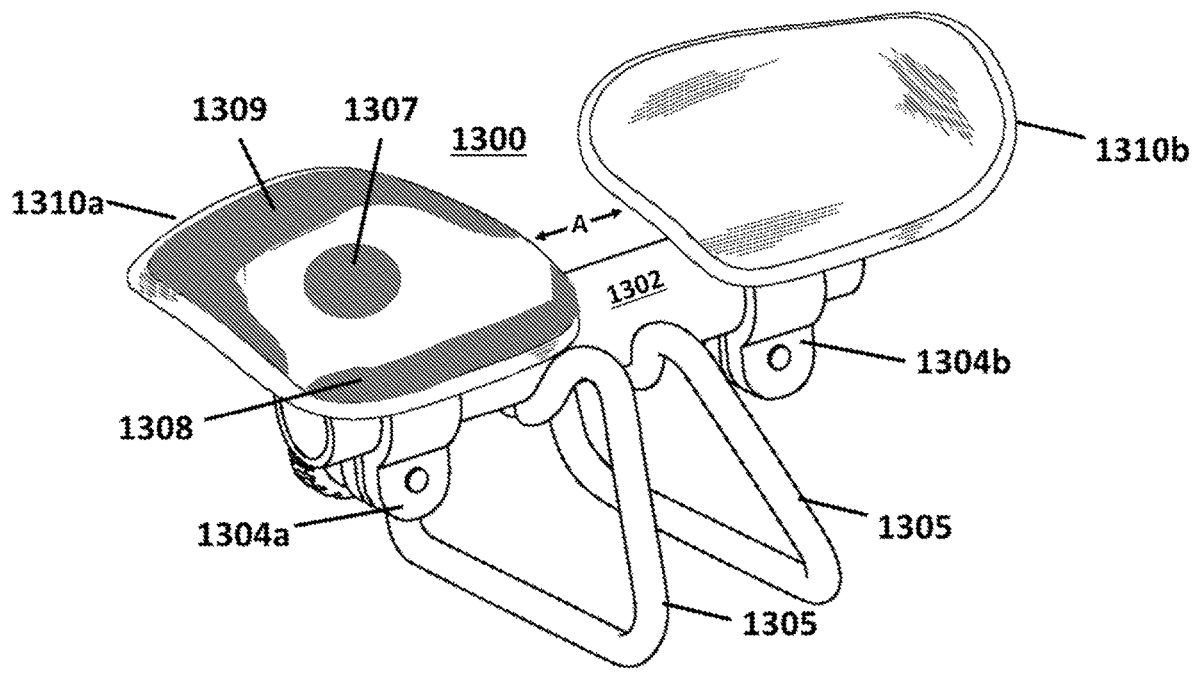
FIG. 13 illustrates a front right-side perspective view of a saddle 1300 having two adjustable seating portions 1310*a*, 1310*b*, according to an embodiment of the invention.

FIG. 13 illustrates a front right-side perspective view of a saddle 1300 having two adjustable seating portions 1310a, 1310b, according to an embodiment of the invention. The two adjustable seating portions 1310a, 1310b are connected via a joining piece 1302. The two adjustable seating portions 1310a, 1310b are held by clamps 1304a, 1304b. The joining piece 1302 is shown as a cylinder but could have other shapes, such as a rectangular prism, so long as it was capable of supporting the two adjustable seating portions 1310a, 1310b and holding them in a proper position with respect to the user's ischial tuberosities.

The front region 1308 (shown as a shaded portion) of each adjustable seating portion 1310a, 1310b is lower than a rear region 1309 (shown as a shaded) of each adjustable seating portion 1310a, 1310b, according to an embodiment of the invention. The rear region 1309 is also somewhat concave while front region 1308 is also somewhat downward slopping. The overall shape of the front region 1308 and the back portion 1309 of each adjustable seating portion 1310a, 1310b helps the rider's posterior stay properly supported on the rider's ischial tuberosities, according to an embodiment of the invention. The adjustable seating portion 1310a is shaped so as to settle the rider's ischial tuberosity into a region 1307 located at a proximal center of the adjustable seating portion 1310a. The region 1307 may receive extra padding or include a material of a higher Shore Durometer reading than the much of the rest of the adjustable seating portion 1310a, according to an embodiment of the invention. The adjustable seating portion 1310b has not been marked with the shadings shown for the adjustable seating portion 1310a but would be so similarly shaped and have similar regions, although accounting for the differences in left/right symmetry of the human body, according to an embodiment of the invention.

Each adjustable seating portion 1310a, 1310b could have a range of different proportions. However, experimentation has shown that the adjustable seating portions 1310a, 1310b may be fairly small, roughly the size of an average human palm (roughly 2-6 inches or 5.08 cm to 15.24 cm) from side to side with roughly a 4-36 square inch (25.81 cm$^2$ to 232.26 cm$^2$) surface area, according to various embodiments of the invention. However, for many years, the trend in racing saddles has been to reduce their size significantly. Consequently, a 2-3-inch (5.08 cm to 7.62 cm) diameter for the adjustable seating portions 1310a, 1310b is more likely with a surface area from 4-9 square inches (25.81 cm$^2$ to 58.1 cm$^2$). FIG. 13 illustrates the physical structure for the saddle 1300 and does not include the softer covering elements that could be added to the saddle 1300 in some embodiments.

As shown in FIG. 13, an open space (marked A) divides the two adjustable seating portions 1310a, 1310b with the intention to provide enhanced comfort and safety for the user and intended to solve some of the health and safety problems previously mentioned. Commercial embodiments of the invention may include adjustable seating portions 1310a, 1310b of differing sizes. A user should select a seating size whose combined distances from seat center to seat edge are less than the user's ischial tuberosity width, e.g., a user with an ischial tuberosity width of 14 cm could choose seats having an overall width of 7.62 cm (the distance from each seat's center to seat edge is 3.81 cm, leaving a separation between the two seats of 6.38 cm (14 cm−(3.82 cm×2)=6.38 cm).

The bars 1305 may be inserted into a clamp held on the bicycle frame (not shown). Such an arrangement allows the seat 1300 to be removed. Thus, for example, two different riders with differing ischial tuberosities could easily share the same bicycle. Of course, there are other means for attaching the seat 1300 to the bicycle frame, such as a post on the joining piece 1302 that attaches (or clamps) to the bicycle frame.

Figure 14:
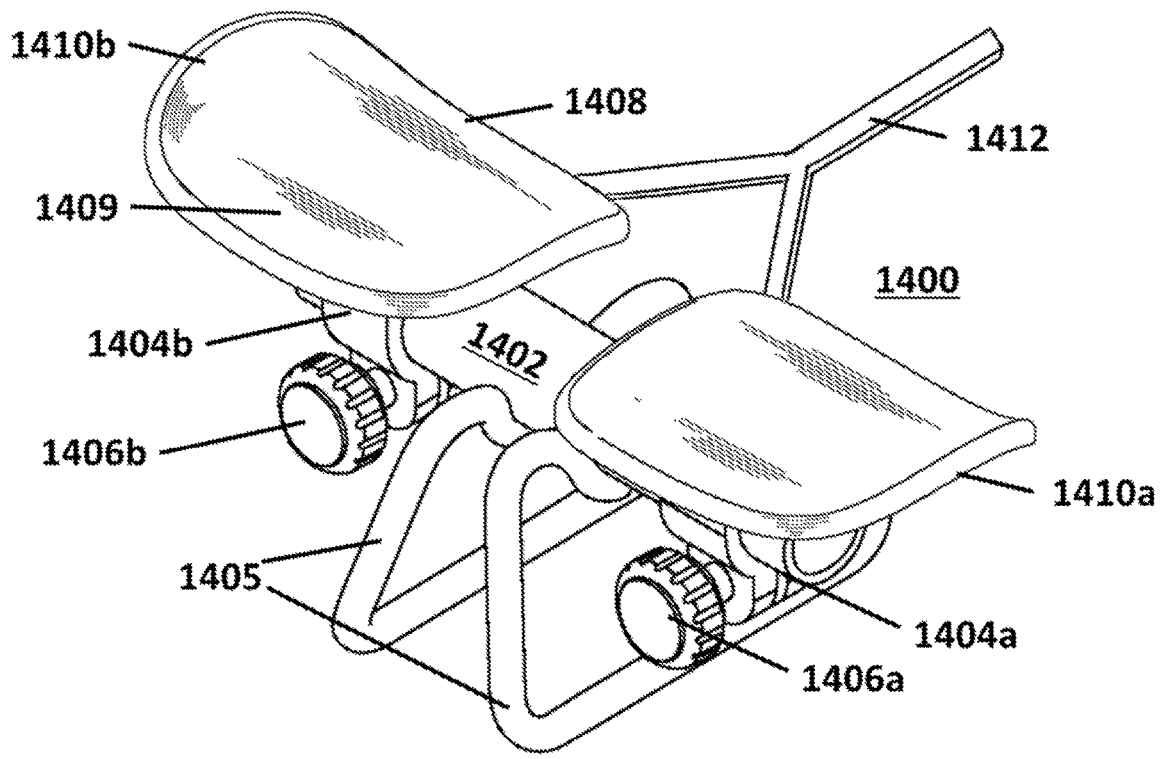
FIG. 14 illustrates a rear right-side perspective view of a saddle 1400 having two adjustable seating portions 1410*a*, 1410*b*, according to an embodiment of the invention.

FIG. 14 illustrates a rear right-side perspective view of a saddle 1400 having two adjustable seating portions 1410a, 1410b, according to an embodiment of the invention. The two adjustable seating portions 1410a, 1410b are connected via a joining piece 1402. The two adjustable seating portions 1410a, 1410b are held by clamps 1404a, 1404b that are fastened by wheels 1406a, 1406b. The clamps 1404a, 1404b are attached to a respective adjustable seating portion 1410a, 1410b.

In use, the adjustable seating portions 1410a, 1410b may slide down the joining piece 1402 away from each other (or even towards each other) until the distance between the load bearing sections (the region 1307 shown in FIG. 13) of the adjustable seating portions 1410a, 1410b matches the distance between the user's ischial tuberosities. Once this distance has been matched, then the wheels 1406a, 1406b may be clamped into place to fasten the adjustable seating portions 1410a, 1410b in place to the joining piece 1402, according to an embodiment of the invention.

The joining piece 1402 is shown as a cylinder but may have other shapes, such as a rectangular prism, so long as it is capable of supporting the two adjustable seating portions 1410a, 1410b and so long as the joining piece 1402 could accommodate fastening devices such as the clamps 1404a, 1404b.

The front region 1408 of each adjustable seating portion 1410a, 1410b is lower than a rear region 1409 of each adjustable seating portion 1410a, 1410b, according to an embodiment of the invention. The perimeters of the regions 1408, 1409 have similar shapes to the regions 1308, 1309 shown in FIG. 13 but have not been shaded here to avoid obscuring other features. The rear region 1409 is also somewhat concave while front region 1408 is also somewhat downward slopping. The overall shape of the front region 1408 and the back portion 1409 of each adjustable seating portion 1410a, 1410b helps the rider's posterior stay properly supported on the rider's ischial tuberosities, according to an embodiment of the invention. The adjustable seating portions 1410a, 1410b are shaped so as to settle the rider's ischial tuberosity into a matching region (e.g., the region 1307 shown in FIG. 13) that resides in roughly the center of each adjustable seating portion 1410a, 1410b.

The saddle 1400 includes a Y-shaped thigh support post 1412 that removably attaches to the joining piece 1402. The removable Y-shaped thigh support post 1412 may serve several functions for some riders. First, some riders may feel so accustomed to conventional bicycle saddles that they feel a need for the conventional triangular saddle shape or some approximation of it. For these riders, the removable Y-shaped thigh support post 1412 may offer them the security of a conventional saddle seat. Second, some riders may feel the need for thigh support during particularly tight turns and other maneuvers. These riders may lean a portion of their thigh on the removable Y-shaped thigh support post 1412 during a turn. Other riders may not find a need for the removable Y-shaped thigh support post 1412 and simply remove it from the saddle 1400 or never install it. One arm of the removable Y-shaped thigh support post 1412 attaches to the joining piece 1402 underneath the first adjustable seating portion 1410a, and another arm of the removable Y-shaped thigh post 1412 attaches to the joining piece 1402 underneath the second adjustable seating portion 1410b. The stem portion of the removable Y-shaped thigh support post 1412 could be any length, such as the length of the average human thigh, and a length from 6 to 18 inches (15.24 cm to 45.72 cm) would seem appropriate for most riders, according to an embodiment of the invention.

Each adjustable seating portion 1410a, 1410b could have a range of different proportions. However, experimentation has shown that the adjustable seating portions 1410a, 1410b may be fairly small, roughly the size of an average human palm or roughly 2-6 inches (or 5.08 cm to 15.24 cm) from side to side with roughly a 4-36 square inch (25.81 cm² to 232.26 cm²) surface area, according to various embodiments of the invention. However, for many years, the trend in racing saddles has been to reduce their size significantly. Consequently, a 2-3-inch (5.08 cm to 7.62 cm) diameter for the adjustable seating portions 1410a, 1410b is more likely with a surface area from 4-9 square inches (25.81 cm² to 58.1 cm²). FIG. 14 illustrates the physical structure for the saddle 1400 and does not include the softer covering elements that could be added to the saddle 1400 in some embodiments.

As shown in FIG. 14, an open space (similar to the distance marked "A" in FIG. 13) divides the two adjustable seating portions 1410a, 1410b with the intention to provide enhanced safety for the user and intended to solve some of the health and safety problems previously mentioned. Commercial embodiments of the invention may include adjustable seating portions 1410a, 1410b of differing sizes. A user should select a seating size whose combined distances from seat center to seat edge are less than the user's ischial tuberosity width, e.g., a user with an ischial tuberosity width of 14 cm could choose seats having an overall width of 7.62 cm (the distance from each seat's center to seat edge is 3.81 cm, leaving a separation between the two seats of 6.38 cm (14 cm−(3.82 cm×2)=6.38 cm).

The bars 1405 may be inserted into a clamp held on the bicycle frame (not shown). Such an arrangement allows the seat 1400 to be removed. Thus, for example, two different riders with differing ischial tuberosities could easily share the same bicycle. Of course, there are other means for attaching the seat 1400 to the bicycle frame, such as a post on the joining piece 1402 that attaches (or clamps) to the bicycle frame.

Figure 15:
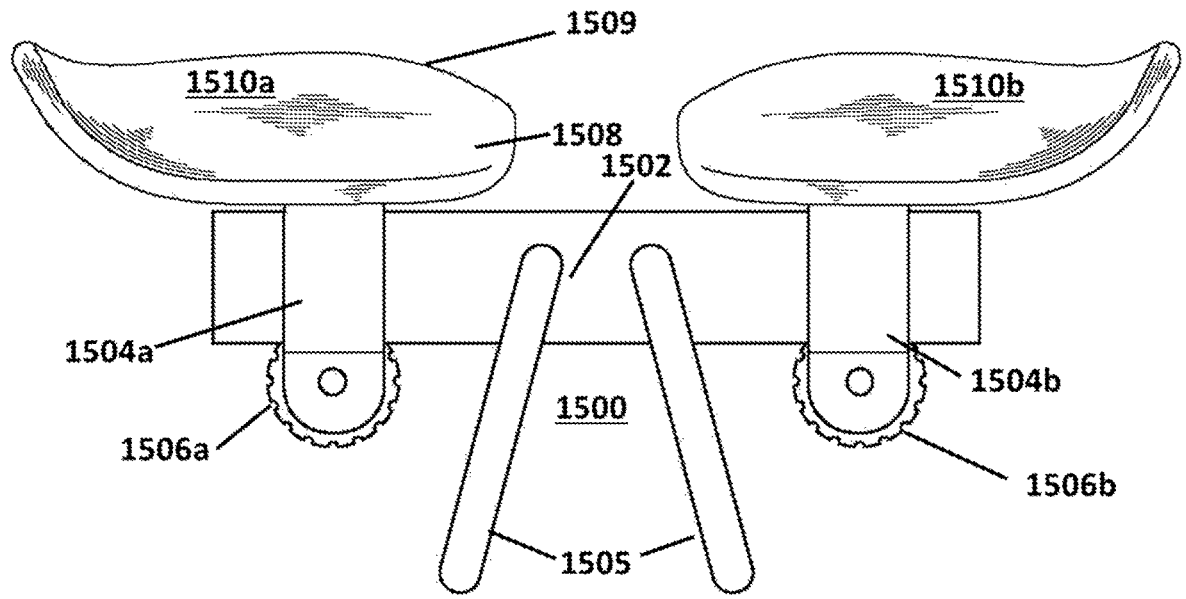
FIG. 15 illustrates a front plan view of a saddle 1500 having two adjustable seating portions 1510*a*, 1510*b*, according to an embodiment of the invention.

FIG. 15 illustrates a front plan view of a saddle 1500 having two adjustable seating portions 1510a, 1510b, according to an embodiment of the invention. The two adjustable seating portions 1510a, 1510b are connected via a joining piece 1502. The two adjustable seating portions 1510a, 1510b are held by clamps 1504a, 1504b that are fastened by wheels 1506a, 1506b. The clamps 1504a, 1504b are attached to a respective adjustable seating portion 1510a, 1510b.

In use, the adjustable seating portions 1510a, 1510b may slide down the joining piece 1502 away from each other (or even towards each other) until the distance between the load bearing sections (equivalent to the region 1307 shown in FIG. 13) of the adjustable seating portions 1510a, 1510b matches the distance between the user's ischial tuberosities. Once this distance has been matched, then the wheels 1506a, 1506b may be clamped into place to fasten the adjustable seating portions 1510a, 1510b in place to the joining piece 1502, according to an embodiment of the invention.

The joining piece 1502 is shown as a cylinder but may have other shapes, such as a rectangular prism, so long as it is capable of supporting the two adjustable seating portions 1510a, 1510b and so long as the joining piece 1502 could accommodate fastening devices such as the clamps 1504a, 1504b.

The front region 1508 of each adjustable seating portion 1510a, 1510b is lower than a rear region 1509 of each adjustable seating portion 1510a, 1510b, according to an embodiment of the invention. The perimeters of the regions 1508, 1509 have similar shapes to the regions 1308, 1309 shown in FIG. 13 but have not been shaded here to avoid obscuring other features. The rear region 1509 is also somewhat concave while front region 1508 is also somewhat downward slopping. The overall shape of the front region 1508 and the back portion 1509 of each adjustable seating portion 1510a, 1510b helps the rider's posterior stay properly supported on the rider's ischial tuberosities, according to an embodiment of the invention. The adjustable seating portions 1510a, 1510b are shaped so as to settle the rider's ischial tuberosity into a matching region (e.g., the region 1307 shown in FIG. 13) that resides in roughly the center of each adjustable seating portion 1510a, 1510b.

Each adjustable seating portion 1510a, 1510b could have a range of different proportions. However, experimentation has shown that the adjustable seating portions 1510a, 1510b may be fairly small, roughly the size of an average human palm or roughly 2-6 inches (or 5.08 cm to 15.24 cm) from side to side with roughly a 4-36 square inch (25.81 cm² to 232.26 cm²) surface area, according to various embodiments of the invention. However, for many years, the trend in racing saddles has been to reduce their size significantly. Consequently, a 2-3-inch (5.08 cm to 7.62 cm) diameter for the adjustable seating portions 1510a, 1510b is more likely with a surface area from 4-9 square inches (25.81 cm² to 58.1 cm²). FIG. 15 illustrates the physical structure for the saddle 1500 and does not include the softer covering elements that could be added to the saddle 1500 in some embodiments.

As shown in FIG. 15, an open space (similar to the distance marked "A" in FIG. 13) divides the two adjustable seating portions 1510a, 1510b with the intention to provide enhanced safety for the user and intended to solve some of the health and safety problems previously mentioned. Commercial embodiments of the invention may include adjustable seating portions 1510a, 1510b of differing sizes. A user should select a seating size whose combined distances from seat center to seat edge are less than the user's ischial tuberosity width, e.g., a user with an ischial tuberosity width of 14 cm could choose seats having an overall width of 7.62 cm (the distance from each seat's center to seat edge is 3.81 cm, leaving a separation between the two seats of 6.38 cm (14 cm−(3.82 cm×2)=6.38 cm).

The bars 1505 may be inserted into a clamp held on the bicycle frame (not shown). Such an arrangement allows the seat 1500 to be removed. Thus, for example, two different riders with differing ischial tuberosities could easily share the same bicycle. Of course, there are other means for attaching the seat 1500 to the bicycle frame, such as a post on the joining piece 1502 that attaches (or clamps) to the bicycle frame.

Figure 16:
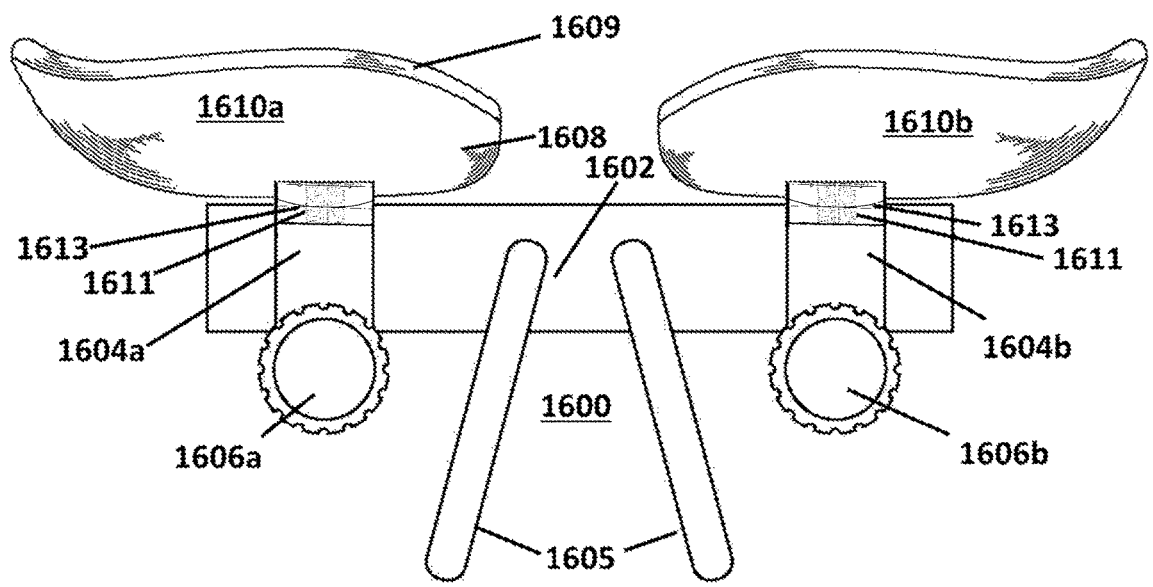
FIG. 16 illustrates a rear plan view of a saddle 1600 having two adjustable seating portions 1610*a*, 1610*b*, according to an embodiment of the invention.

FIG. 16 illustrates a rear plan view of a saddle 1600 having two adjustable seating portions 1610a, 1610b, according to an embodiment of the invention. The two adjustable seating portions 1610a, 1610b are connected via a joining piece 1602. The two adjustable seating portions 1610a, 1610b are held by clamps 1604a, 1604b that are fastened by wheels 1606a, 1606b. The clamps 1604a, 1604b are attached to a respective adjustable seating portion 1610a, 1610b.

In use, the adjustable seating portions 1610a, 1610b may slide down the joining piece 1602 away from each other (or even towards each other) until the distance between the load bearing sections (e.g., corresponding to the region 1307 shown in FIG. 13) of the adjustable seating portions 1610a, 1610b matches the distance between the user's ischial tuberosities. Once this distance has been matched, then the wheels 1606a, 1606b may be clamped into place to fasten the adjustable seating portions 1610a, 1610b in place to the joining piece 1602, according to an embodiment of the invention.

The joining piece 1602 is shown as a cylinder but may have other shapes, such as a rectangular prism, so long as it was capable of supporting the two adjustable seating portions 1610*a*, 1610*b* and so long as the joining piece 1602 could accommodate fastening devices such as the clamps 1604*a*, 1604*b*. The clamps 1604*a*, 1604*b* may include internal rockers 1613*s* that are respectively mounted to spring 1611*s*, according to an embodiment of the invention. The rocker 1613 and spring 1611 allow each adjustable seating portion 1610*a*, 1610*b* to flex by some amount (e.g., from 0 to 30 degrees) both inward and outward. The springs 1611 may have various spring constants from loose to stiff. The springs 1611 and rockers 1613 are shown here in a cutaway but could be mounted in a variety of different ways. For example, the springs 1611 and rockers 1613 could be mounted directly on the adjustable seating portions 1610*a*, 1610*b*, according to an alternative embodiment of the invention.

The front region 1608 of each adjustable seating portion 1610*a*, 1610*b* is lower than a rear region 1609 of each adjustable seating portion 1610*a*, 1610*b*, according to an embodiment of the invention. The perimeters of the regions 1608, 1609 have similar shapes to the regions 1308, 1309 shown in FIG. 13 but have not been shaded here to avoid obscuring other features. The rear region 1609 is also somewhat concave while front region 1608 is also somewhat downward slopping. The overall shape of the front region 1608 and the back portion 1609 of each adjustable seating portion 1610*a*, 1610*b* helps the rider's posterior stay properly supported on the rider's ischial tuberosities, according to an embodiment of the invention. The adjustable seating portions 1610*a*, 1610*b* are shaped so as to settle the rider's ischial tuberosity into a matching region (e.g., the region 1307 shown in FIG. 13) that resides in roughly the center of each adjustable seating portion 1510*a*, 1510*b*.

Each adjustable seating portion 1610*a*, 1610*b* could have a range of different proportions. However, experimentation has shown that the adjustable seating portions 1610*a*, 1610*b* may be fairly small, roughly the size of an average human palm or roughly 2-6 inches (or 5.08 cm to 15.24 cm) from side to side with roughly a 4-36 square inch (25.81 cm$^2$ to 232.26 cm$^2$) surface area, according to various embodiments of the invention. However, for many years, the trend in racing saddles has been to reduce their size significantly. Consequently, a 2-3-inch (5.08 cm to 7.62 cm) diameter for the adjustable seating portions 1610*a*, 1610*b* is more likely with a surface area from 4-9 square inches (25.81 cm$^2$ to 58.1 cm$^2$). FIG. 16 illustrates the physical structure for the saddle 1600 and does not include the softer covering elements that could be added to the saddle 1600 in some embodiments.

As shown in FIG. 16, an open space (similar to the open space marked "A" in FIG. 13) divides the two adjustable seating portions 1610*a*, 1610*b* with the intention to provide enhanced safety for the user and intended to solve some of the health and safety problems previously mentioned. Commercial embodiments of the invention may include adjustable seating portions 1610*a*, 1610*b* of differing sizes. A user should select a seating size whose combined distances from seat center to seat edge are less than the user's ischial tuberosity width, e.g., a user with an ischial tuberosity width of 14*cm* could choose seats having an overall width of 7.62 cm (the distance from each seat's center to seat edge is 3.81 cm, leaving a separation between the two seats of 6.38 cm (14 cm−(3.82 cm×2)=6.38 cm).

The bars 1605 may be inserted into a clamp held on the bicycle frame (not shown). Such an arrangement allows the seat 1600 to be removed. Thus, for example, two different riders with differing ischial tuberosities could easily share the same bicycle. Of course, there are other means for attaching the seat 1600 to the bicycle frame, such as a post on the joining piece 1602 that attaches (or clamps) to the bicycle frame.

Figure 17:
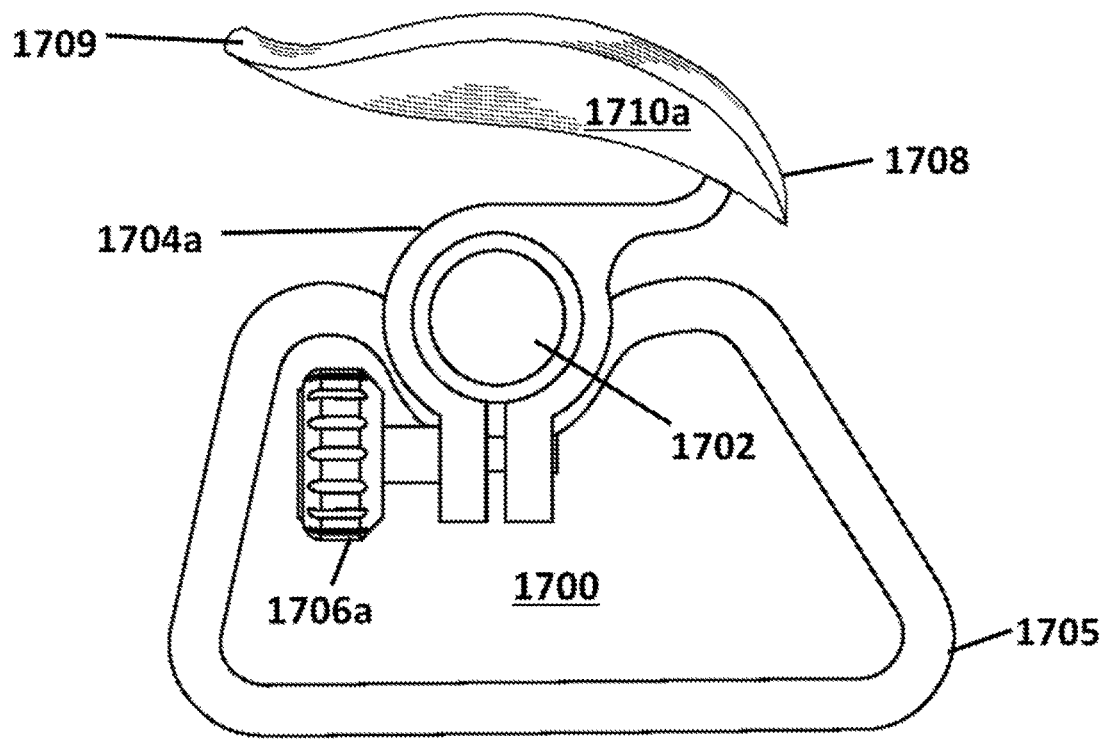
FIG. 17 illustrates a right-side view of a saddle 1700 showing an adjustable seating portion 1710*a*, according to an embodiment of the invention.

FIG. 17 illustrates a right-side view of a saddle 1700 showing an adjustable seating portion 1710*a*, according to an embodiment of the invention. The adjustable seating portion 1710*a* would be accompanied on the saddle 1700 by another adjustable seating portion, such as the adjustable seating portion 1610*b* shown in FIG. 16. The adjustable seating portion 1710*a* is connected via a joining piece 1702 to the other adjustable seating portion. The adjustable seating portion 1710*a* is held by a clamp 1704*a* that is fastened by a wheel 1706*a* to the joining piece 1702. The clamp 1704*a* is attached to the adjustable seating portion 1710*a*.

In use, the adjustable seating portion 1710*a* may slide down the joining piece 1702 away from the other adjustable seating portion (or even towards the other adjustable seating portion) until the distance between the load bearing sections (corresponding to the region 1307 shown in FIG. 13) of the adjustable seating portions matches the distance between the user's ischial tuberosities. Once this distance has been matched, then the wheel 1706*a* may be clamped into place to fasten the adjustable seating portion 1710*a* in place around the joining piece 1702, according to an embodiment of the invention.

The joining piece 1702 is shown as a cylinder but may have other shapes, such as a rectangular prism, so long as it was capable of supporting the two adjustable seating portions, and so long as the joining piece 1702 could accommodate fastening devices such as the clamp 1704*a*.

The front region 1708 of the adjustable seating portion 1710*a* is lower than a rear region 1709 of the adjustable seating portion 1710*a*, according to an embodiment of the invention. The perimeters of the regions 1708, 1709 have similar shapes to the regions 1308, 1309 shown in FIG. 13 but have not been shaded here to avoid obscuring other features. The rear region 1709 is also somewhat concave while front region 1708 is also somewhat downward slopping. The overall shape of the front region 1708 and the back portion 1709 of the adjustable seating portion 1710*a* helps the rider's posterior stay properly supported on the rider's ischial tuberosities, according to an embodiment of the invention. The adjustable seating portions 1710*a* is shaped so as to settle the rider's ischial tuberosity into a matching region (e.g., the region 1307 shown in FIG. 13) that resides in roughly the center of the adjustable seating portion 1710*a*.

The adjustable seating portion 1710*a* could have a range of different proportions. However, experimentation has shown that the adjustable seating portion 1710*b* may be fairly small, roughly the size of an average human palm or roughly 2-6 inches (or 5.08 cm to 15.24 cm) from side to side with roughly a 4-36 square inch (25.81 cm$^2$ to 232.26 cm$^2$) surface area, according to various embodiments of the invention. However, for many years, the trend in racing saddles has been to reduce their size significantly. Consequently, a 2-3-inch (5.08 cm to 7.62 cm) diameter for the adjustable seating portions 1710*a*, 1710*b* is more likely with a surface area from 4-9 square inches (25.81 cm$^2$ to 58.1 cm$^2$). FIG. 17 illustrates the physical structure for the saddle 1700 and does not include the softer covering elements that could be added to the saddle 1700 in some embodiments.

The bars 1705 may be inserted into a clamp held on the bicycle frame (not shown). Such an arrangement allows the seat 1700 to be removed. Thus, for example, two different riders with differing ischial tuberosities could easily share the same bicycle. Of course, there are other means for attaching the seat 1700 to the bicycle frame, such as a post on the joining piece 1702 that attaches (or clamps) to the bicycle frame.

Figure 18:
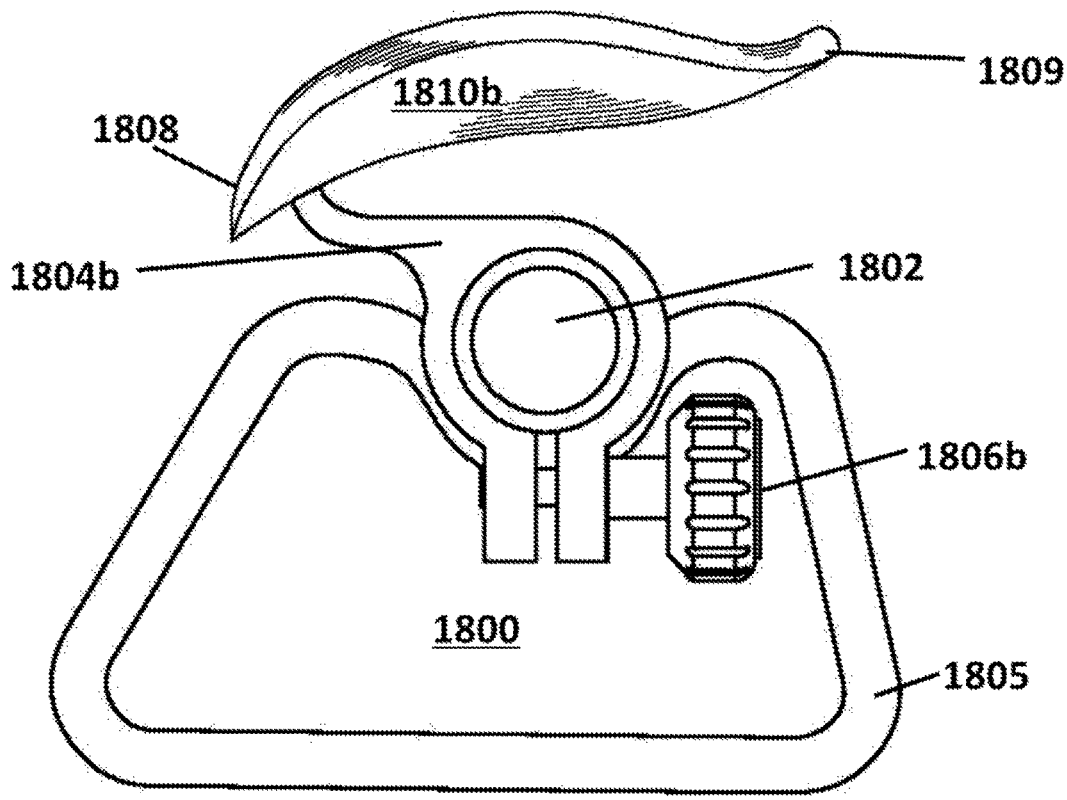
FIG. 18 illustrates a left-side view a saddle 1800 showing an adjustable seating portion 1810*b*, according to an embodiment of the invention.

FIG. 18 illustrates a left-side view of a saddle 1800 showing an adjustable seating portion 1810*b*, according to an embodiment of the invention. The adjustable seating portion 1810*b* would be accompanied on the saddle 1800 by another adjustable seating portion, such as the adjustable seating portion 1610*a* shown in FIG. 16. The adjustable seating portion 1810*b* is connected via a joining piece 1802 to the other adjustable seating portion. The adjustable seating portion 1810*b* is held by a clamp 1804*a* that is fastened by a wheel 1806*b* to the joining piece 1802. The clamp 1804*b* is attached to the adjustable seating portion 1810*b*.

In use, the adjustable seating portion 1810*b* may slide down the joining piece 1802 away from the other adjustable seating portion (or even towards the other adjustable seating portion) until the distance between the load bearing sections (e.g., the region 1307 in FIG. 13) of the adjustable seating portions matches the distance between the user's ischial tuberosities. Once this distance has been matched, then the wheel 1806*b* may be clamped into place to fasten the adjustable seating portion 1810*b* in place around the joining piece 1802, according to an embodiment of the invention.

The joining piece 1802 is shown as a cylinder but may have other shapes, such as a rectangular prism, so long as it is capable of supporting the two adjustable seating portions, and so long as the joining piece 1802 could accommodate fastening devices such as the clamp 1804*b*.

The front region 1808 of the adjustable seating portion 1810*b* is lower than a rear region 1809 of the adjustable seating portion 1810*b*, according to an embodiment of the invention. The perimeters of the regions 1808, 1809 have similar shapes to the regions 1308, 1309 shown in FIG. 13 but have not been shaded here to avoid obscuring other features. The rear region 1809 is also somewhat concave while front region 1408 is also somewhat downward slopping. The overall shape of the front region 1808 and the back portion 1809 of the adjustable seating portion 1810*b* helps the rider's posterior stay properly supported on the rider's ischial tuberosities, according to an embodiment of the invention. The adjustable seating portion 1410*b* is shaped so as to settle the rider's ischial tuberosity into a matching region (e.g., the region 1307 shown in FIG. 13) that resides in roughly the center of the adjustable seating portion 1810*b*.

The adjustable seating portion 1810*b* could have a range of different proportions. However, experimentation has shown that the adjustable seating portion 1810*b* may be fairly small, roughly the size of an average human palm or roughly 2-6 inches (or 5.08 cm to 15.24 cm) from side to side with roughly a 4-36 square inch (25.81 cm$^2$ to 232.26 cm$^2$) surface area, according to various embodiments of the invention. However, for many years, the trend in racing saddles has been to reduce their size significantly. Consequently, a 2-3-inch (5.08 cm to 7.62 cm) diameter for the adjustable seating portions 1810*a*, 1810*b* is more likely with a surface area from 4-9 square inches (25.81 cm$^2$ to 58.1 cm$^2$). FIG. 18 illustrates the physical structure for the saddle 1800 and does not include the softer covering elements that could be added to the saddle 1800 in some embodiments.

The bar 1805 may be inserted into a clamp held on the bicycle frame (not shown). Such an arrangement allows the seat 1800 to be removed. Thus, for example, two different riders with differing ischial tuberosities could easily share the same bicycle. Of course, there are other means for attaching the seat 1800 to the bicycle frame, such as a post on the joining piece 1802 that attaches (or clamps) to the bicycle frame.

FIG. 19 illustrates a top plan view of a saddle 1900 having two adjustable seating portions 1910*a*, 1910*b*, according to an embodiment of the invention. The two adjustable seating portions 1910*a*, 1910*b* are connected via a joining piece 1902. The two adjustable seating portions 1910*a*, 1910*b* are held by clamps (e.g., clamps 1604*a*, 1604*b* that are fastened by wheels 1606*a*, 1606*b* shown in FIG. 16).

In use, the adjustable seating portions 1910*a*, 1910*b* may slide down the joining piece 1902 away from each other (or even towards each other) until the distance between the load bearing sections (corresponding to the region 1307 shown in FIG. 13) of the adjustable seating portions 1910*a*, 1910*b* matches the distance between the user's ischial tuberosities. Once this distance has been matched, then the wheels (e.g., the wheels 1606*a*, 1606*b* shown in FIG. 16) may be clamped into place to fasten the adjustable seating portions 1910*a*, 1910*b* in place around the joining piece 1902, according to an embodiment of the invention.

The joining piece 1902 may have a variety of shapes, such as a cylinder or rectangular prism, so long as it was capable of supporting the two adjustable seating portions 1910*a*, 1910*b* and so long as the joining piece 1902 could accommodate fastening devices such as clamps.

The front region 1908 of each adjustable seating portion 1910*a*, 1910*b* is lower than a rear region 1909 of each adjustable seating portion 1910*a*, 1910*b*, according to an embodiment of the invention. The perimeters of the regions 1908, 1909 have similar shapes to the regions 1308, 1309 shown in FIG. 13 but have not been shaded here to avoid obscuring other features. The rear region 1909 is also somewhat concave while front region 1908 is also somewhat downward slopping. The overall shape of the front region 1908 and the back portion 1909 of each adjustable seating portion 1910*a*, 1910*b* helps the rider's posterior stay properly supported on the rider's ischial tuberosities, according to an embodiment of the invention. The adjustable seating portions 1910*a*, 1910*b* are shaped so as to settle the rider's ischial tuberosity into a matching region (e.g., the region 1307 shown in FIG. 13) that resides in roughly the center of each adjustable seating portion 1910*a*, 1910*b*.

Each adjustable seating portion 1910*a*, 1910*b* could have a range of different proportions. However, experimentation has shown that the adjustable seating portions 1910*a*, 1910*b* may be fairly small, roughly the size of an average human palm or roughly 2-6 inches (or 5.08 cm to 15.24 cm) from side to side with roughly a 4-36 square inch (25.81 cm$^2$ to 232.26 cm$^2$) surface area, according to various embodiments of the invention. However, for many years, the trend in racing saddles has been to reduce their size significantly. Consequently, a 2-3-inch (5.08 cm to 7.62 cm) diameter for the adjustable seating portions 1910*a*, 1910*b* is more likely with a surface area from 4-9 square inches (25.81 cm$^2$ to 58.1 cm$^2$). FIG. 19 illustrates the physical structure for the saddle 1900 and does not include the softer covering elements that could be added to the saddle 1900 in some embodiments.

As shown in FIG. 19, an open space (similar to the open space marked "A" in FIG. 13) divides the two adjustable seating portions 1910*a*, 1910*b* with the intention to provide enhanced safety for the user and intended to solve some of the health and safety problems previously mentioned. Commercial embodiments of the invention may include adjustable seating portions 1910*a*, 1910*b* of differing sizes. A user should select a seating size whose combined distances from seat center to seat edge are less than the user's ischial tuberosity width, e.g., a user with an ischial tuberosity width of 14 cm could choose seats having an overall width of 7.62 cm (the distance from each seat's center to seat edge is 3.81 cm, leaving a separation between the two seats of 6.38 cm (14 cm−(3.82 cm×2)=6.38 cm).

The bars 1905 may be inserted into a clamp held on the bicycle frame (not shown). Such an arrangement allows the seat 1900 to be removed. Thus, for example, two different riders with differing ischial tuberosities could easily share the same bicycle. Of course, there are other means for attaching the seat 1900 to the bicycle frame, such as a post on the joining piece 1902 that attaches (or clamps) to the bicycle frame.

FIG. 20 illustrates an exploded view of a saddle 2000 having two adjustable seating portions 2010a, 2010b, according to an embodiment of the invention. The two adjustable seating portions 2010a, 2010b are connected via a joining piece 2002. The two adjustable seating portions 2010a, 2010b are held by clamps 2004a, 2004b that are fastened by wheels 2006a, 2006b. The clamps 2004a, 2004b are attached to a respective adjustable seating portion 2010a, 2010b.

In use, the adjustable seating portions 2010a, 2010b may slide down the joining piece 2002 away from each other (or even towards each other) until the distance between the load bearing sections (e.g., corresponding to the region 1307 shown in FIG. 13) of the adjustable seating portions 2010a, 2010b matches the distance between the user's ischial tuberosities. Once this distance has been matched, then the wheels 2006a, 2006b may be clamped into place to fasten the adjustable seating portions 2010a, 2010b in place around the joining piece 2002, according to an embodiment of the invention.

The joining piece 2002 is shown as a cylinder but may have other shapes, such as a rectangular prism, so long as it is capable of supporting the two adjustable seating portions 2010a, 2010b and so long as the joining piece 2002 could accommodate fastening devices such as the clamps 2004a, 2004b.

The joining piece 2002 may include a series of markings 2014 that aid in the adjustment of the adjustable seating portion 2010a and the adjustable seating portion 2010b to match the width of the user's ischial tuberosities. The markings 2014 could comprise one or more relevant measuring units, such as inches or millimeters, or could even comprise unique units that were relative and/or non-standard. In any event the markings 2014 should be regularly spaced across the joining piece 2002 to simplify adjustment, according to an embodiment of the invention. The clamps 2004a, 2004b could include an open viewing portion so that the user could align the adjustable seating portions 2010a, 2010b with the markings 2014. Alternatively, the user could use the front edge of clamps 2004a, 2004b as a marking position. This approach should work well if the user also knows the distance between the front edge of the clamp and the precise location on each adjustable seating portion 2010a, 2010b that is intended to match the user's ischial tuberosities, according to an embodiment of the invention.

The front region 2008 of each adjustable seating portion 2010a, 2010b is lower than a rear region 2009 of each adjustable seating portion 2010a, 2010b, according to an embodiment of the invention. The perimeters of the regions 2008, 2009 have similar shapes to the regions 1308, 1309 shown in FIG. 13 but have not been shaded here to avoid obscuring other features. The rear region 2009 is also somewhat concave while front region 2008 is also somewhat downward slopping. The overall shape of the front region 2008 and the back portion 2009 of each adjustable seating portion 2010a, 2010b helps the rider's posterior stay properly supported on the rider's ischial tuberosities, according to an embodiment of the invention. The adjustable seating portions 2010a, 2010b are shaped so as to settle the rider's ischial tuberosity into a matching region (e.g., the region 1307 shown in FIG. 13) that resides in roughly the center of each adjustable seating portion 2010a, 2010b.

Each adjustable seating portion 2010a, 2010b could have a range of different proportions. However, experimentation has shown that the adjustable seating portions 2010a, 2010b may be fairly small, roughly the size of an average human palm or roughly 2-6 inches (or 5.08 cm to 15.24 cm) from side to side with roughly a 4-36 square inch (25.81 cm$^2$ to 232.26 cm$^2$) surface area, according to various embodiments of the invention. However, for many years, the trend in racing saddles has been to reduce their size significantly. Consequently, a 2-3-inch (5.08 cm to 7.62 cm) diameter for the adjustable seating portions 2010a, 2010b is more likely with a surface area from 4-9 square inches (5.81 cm$^2$ to 58.1 cm$^2$). FIG. 20 illustrates the physical structure for the saddle 2000 and does not include the softer covering elements that could be added to the saddle 2000 in some embodiments.

Once assembled, an open space (similar to the area marked "A" in FIG. 13) divides the two adjustable seating portions 2010a, 2010b with the intention to provide enhanced safety for the user and intended to solve some of the health and safety problems previously mentioned. Commercial embodiments of the invention may include adjustable seating portions 2010a, 2010b of differing sizes. A user should select a seating size whose combined distances from seat center to seat edge are less than the user's ischial tuberosity width, e.g., a user with an ischial tuberosity width of 14 cm could choose seats having an overall width of 7.62 cm (the distance from each seat's center to seat edge is 3.81 cm, leaving a separation between the two seats of 6.38 cm (14 cm−(3.82 cm×2)=6.38 cm).

The bars 2005 may be inserted into a clamp held on the bicycle frame (not shown). Such an arrangement allows the seat 2000 to be removed. Thus, for example, two different riders with differing ischial tuberosities could easily share the same bicycle. Of course, there are other means for attaching the seat 2000 to the bicycle frame, such as a post on the joining piece 2002 that attaches (or clamps) to the bicycle frame.

Some embodiments of the invention may further comprise gel or a gel-covered structure to spread pressure from the user's weight and avoid damage to the user's spine. The gel could comprise various hardness measurements on an appropriate Shore Durometer scale, e.g., 15-30 on the Shore 00 scale.

Various embodiments of the invention have been described in detail with reference to the accompanying drawings. References made to particular examples and implementations are for illustrative purposes and are not intended to limit the scope of the invention or the claims.

It should be apparent to those skilled in the art that many more modifications of the invention besides those already described are possible without departing from the inventive concepts herein. The inventive subject matter, therefore, is not to be restricted except by the scope of the appended claims. Moreover, in interpreting both the specification and the claims, all terms should be interpreted in the broadest possible manner consistent with the context.

Headings and sub-headings provided herein have been provided as an assistance to the reader and are not meant to limit the scope of the invention disclosed herein. Headings and sub-headings are not intended to be the sole or exclusive location for the discussion of a particular topic.

While specific embodiments of the invention have been illustrated and described, it will be clear that the invention is not limited to these embodiments only. Embodiments of the invention discussed herein may have generally implied the use of materials from certain named equipment manufacturers; however, the invention may be adapted for use with equipment from other sources and manufacturers. Equipment used in conjunction with the invention may be configured to operate according to conventional protocols and/or may be configured to operate according to specialized protocols. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification but should be construed to include all systems and methods that operate under the claims set forth hereinbelow. Thus, it is intended that the invention covers the modifications and variations of this invention provided they come within the scope of the appended claims and their equivalents.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

I claim:

1. A bicycle saddle for a bicycle, comprising:
   a first adjustable seating portion, the first adjustable seating portion shaped to accommodate a first of a user's two ischial tuberosities, such that a first portion of a mass of the user's upper body rests on the user's first ischial tuberosity on the first adjustable seating portion;
   a second adjustable seating portion, the second seating portion shaped to accommodate a second of the user's two ischial tuberosities, such that a second portion of the mass of the user's upper body rests on the user's second ischial tuberosity on the second adjustable seating portion; and
   a joining piece that connects to the first adjustable seating portion and connects to the second adjustable seating portion, the first adjustable seating portion and the second adjustable seating portion aligned on the joining piece such that the mass of the user's upper body rests on the user's two ischial tuberosities on the first adjustable seating portion and the second adjustable seating portion, wherein the joining piece comprises a plurality of measurement markings that facilitate customizing the bicycle saddle to match a distance between the user's two ischial tuberosities as measured from a distance between a first center of mass on the first adjustable seating portion to a second center of mass portion on the second adjustable seating portion.

2. The bicycle saddle of claim 1 wherein the first adjustable seating portion has a lower front area facing the user's forward direction when the user sits on the bicycle and a back area higher than the front area, and wherein the second adjustable seating portion has a lower front area facing the user's forward direction when the user sits on the bicycle and a back area higher than the front area.

3. The bicycle saddle of claim 1, further comprising:
   a thigh support post extending forward towards a front of the bicycle and removably attached to the joining piece in at least one location.

4. The bicycle saddle of claim 3, wherein the thigh support post has a "Y" shape such that one portion of the "Y" shape is removably attached to the joining piece in a region proximally near the first adjustable seating portion and a second portion of the "Y" shape is removably attached to the joining piece in a region proximally near the second adjustable seating portion.

5. The bicycle saddle of claim 1, further comprising:
   a first clamp attached to the first adjustable seating portion and configured to hold the first adjustable seating portion to the joining piece; and
   a second clamp attached to the second adjustable seating portion and configured to hold the second adjustable seating portion to the joining piece.

6. The bicycle saddle of claim 5, further comprising:
   a first spring mounted to a first rocker, the first rocker attached to the first clamp, wherein the first spring and the first rocker allow the first adjustable seating portion to flex laterally to a degree away from the joining piece and to flex inwards towards the joining piece; and
   a second spring mounted to a second rocker, the second rocker attached to the second clamp, wherein the second spring and the second rocker allow the second adjustable seating portion to flex laterally to a degree away from the joining piece and to flex inwards towards the joining piece.

7. The bicycle saddle of claim 6 wherein the degree ranges from 0 degrees to 30 degrees.

8. The bicycle saddle of claim 5 wherein the joining piece comprises a cylinder, wherein the first clamp has a circular opening adapted to receive the cylinder, wherein the second clamp has a circular opening adapted to receive the cylinder.

9. The bicycle saddle of claim 5, further comprising:
   a first lock configured to hold the first clamp in place on the joining piece;
   a second lock configured to hold the second clamp in place on the joining piece.

10. The bicycle saddle of claim 9 wherein the first lock includes a first wheel that may be used to hand tighten the first lock to the joining piece and wherein the second lock includes a second wheel that may be used to hand tighten the second lock to the joining piece.

11. The bicycle saddle of claim 1 wherein a surface area of the first adjustable seating portion ranges from 4 to 16 square inches (25.81 cm$^2$ to 103.23 cm$^2$), and wherein a surface area of the second adjustable seating portion ranges from 4 to 16 square inches (25.81 cm$^2$ to 103.23 cm$^2$).

12. The bicycle saddle of claim 1 wherein the surface area of the first adjustable seating portion is less than 9 square inches (58.06 cm$^2$) and wherein the surface area of the second adjustable seating portion is less than 9 square inches (58.06 cm$^2$).

13. The bicycle saddle of claim 1 wherein a surface area of the first adjustable seating portion includes a soft, cushion cover and wherein the surface area of the second adjustable seating portion includes a soft, cushion cover.

14. The bicycle saddle of claim 1, further comprising:
a clamping bar attached to the joining piece and configurable for attachment to a bicycle, wherein the clamping bar holds the bicycle saddle to the bicycle.

15. The bicycle saddle of claim 1 wherein an edge of the first adjustable seating portion closest to an edge of the second adjustable seating portion is separated from the edge of the second adjustable seating portion to create an open region between them.

16. The bicycle saddle of claim 1 wherein the first adjustable seating portion is shaped to have a concave region at a rear area of the first adjustable seating portion and a front region lower than the rear region, wherein the front region and the rear region shape the first adjustable seating portion to hold the first user ischial tuberosity in a proximal center of the first adjustable seating portion, and wherein the second adjustable seating portion is shaped to have a concave region at a rear area of the second adjustable seating portion and a front region lower than the rear region, wherein the front region and the rear region shape the second adjustable seating portion to hold the second user ischial tuberosity in a proximal center of the second adjustable seating portion.

17. The bicycle saddle of claim 1 wherein at least a portion of a surface area of the first adjustable seating portion is covered with a padding material having a Shore Durometer measurement from 15 to 30 on the Shore 00 scale and wherein at least a portion of a surface area of the second adjustable seating portion is covered with a padding material having a Shore Durometer measurement from 15 to 30 on the Shore 00 scale.

18. The bicycle saddle of claim 1, further comprising:
a first removeable plug configured to seal a first hole passing through the first adjustable seating portion, the first hole corresponding to a location for the user's first ischial tuberosity on the first adjustable seating portion;
a second removeable plug configured to seal a second hole passing through the second adjustable seating portion, the second hole corresponding to a location for the user's second ischial tuberosity on the second adjustable seating portion;
wherein removal of the first removeable plug enables visual inspection of first measurement markings of the plurality of measurement markings immediately below the first hole and wherein removal of the second removeable plug enables visual inspection of second measurement markings of the plurality of measurement markings immediately below the second hole.

19. A method of custom fitting a bicycle saddle to match a user's ischial tuberosities, comprising:
loosening a first clamp attached to a first adjustable seating portion, wherein the first clamp holds the first adjustable seating portion to a joining piece, the first adjustable seating portion shaped to accommodate a first of the user's two ischial tuberosities, such that a first portion of a mass of the user's upper body rests on the user's first ischial tuberosity on the first adjustable seating portion;
loosening a second clamp attached to a second adjustable seating portion, wherein the second clamp holds the second adjustable seating portion to the joining piece, the second adjustable seating portion shaped to accommodate a second of the user's two ischial tuberosities, such that a second portion of a mass of the user's upper body rests on the user's second ischial tuberosity on the second adjustable seating portion;
obtaining a distance between the user's two ischial tuberosities;
adjusting a location of the first adjustable seating portion on the joining piece by first consulting measurement markings of a plurality of measurement markings on the joining piece to match a first half distance between the user's two ischial tuberosities, the first half distance measured on the joining piece from a center of the first adjustable seating portion to a midway point on the joining piece;
adjusting a location the second adjustable seating portion on the joining piece by consulting second measurement markings of the plurality of measurement markings on the joining piece to match a second half distance between the user's two ischial tuberosities, the second half distance measured on the joining piece from a center of the second adjustable seating portion to the midway point on the joining piece, wherein the sum of the first half distance and the second half distance matches the distance between the user's two ischial tuberosities;
re-tightening the first clamp; and
re-tightening the second clamp.

20. The method of claim 19, comprising:
removing a first plug in the center of the first adjustable seating portion to expose a first hole that passes through the first adjustable seating portion; and
removing a second plug in the center of the second adjustable seating portion to expose a second hole that passes through the first adjustable seating portion;
wherein adjusting the first adjustable seating portion to match a first half distance between the user's two ischial tuberosities comprises visual inspection of the first measurement markings of the plurality of measurement markings on the joining piece immediately below the first hole, and
wherein adjusting the second adjustable seating portion to match a second half distance between the user's two ischial tuberosities comprises visual inspection of the second measurement markings of the plurality of measurement markings on the joining piece immediately below the second hole.

* * * * *